(12) United States Patent
Keller et al.

(10) Patent No.: US 6,587,403 B1
(45) Date of Patent: *Jul. 1, 2003

(54) MUSIC JUKEBOX

(75) Inventors: Peter J. Keller, Lake Forest, IL (US); Michael J. Kelley, Arlington Heights, IL (US)

(73) Assignee: Advanced Audio Devices, LLC, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,069

(22) Filed: Aug. 17, 2000

Related U.S. Application Data

(63) Continuation of application No. 09/111,989, filed on Jul. 8, 1998.
(60) Provisional application No. 60/051,999, filed on Jul. 9, 1997.

(51) Int. Cl.[7] ............................................. G11B 21/08
(52) U.S. Cl. ................. 369/30.06; 369/30.05
(58) Field of Search ............... 369/30.06, 33, 369/34, 36, 37, 178, 30.05, 30.27, 30.28, 33.01, 34.01, 178.01

(56) References Cited

U.S. PATENT DOCUMENTS

| | | | |
|---|---|---|---|
| 4,375,083 A | 2/1983 | Maxemchuk | |
| 4,823,333 A | 4/1989 | Satoh et al. | |
| 5,253,234 A | * 10/1993 | Ogawa et al. | ................. 369/30 |
| 5,325,352 A | 6/1994 | Matsumoto | |
| 5,414,688 A | 5/1995 | Inokuchi | |
| 5,418,762 A | * 5/1995 | Kitayama | ..................... 369/13 |
| 5,473,595 A | 12/1995 | Hayashi et al. | |
| 5,481,509 A | 1/1996 | Knowles | |
| 5,490,125 A | 2/1996 | Takada et al. | |
| 5,493,548 A | 2/1996 | Kamioka | |
| 5,586,093 A | 12/1996 | Honda et al. | |
| 5,587,978 A | 12/1996 | Endo et al. | |
| 5,608,707 A | 3/1997 | Ogawa et al. | |
| 5,610,893 A | 3/1997 | Soga et al. | |
| 5,633,839 A | 5/1997 | Alexander et al. | |
| 5,732,059 A | 3/1998 | Katsuyama et al. | |
| 5,740,134 A | 4/1998 | Peterson | |
| 5,777,811 A | 7/1998 | Bodo | |
| 5,790,498 A | 8/1998 | Jeong | |
| 5,792,971 A | * 8/1998 | Timis et al. | ................... 369/83 |
| 5,892,738 A | * 4/1999 | Hirao et al. | .................. 369/30 |
| 5,959,944 A | 9/1999 | Dockes et al. | |
| 5,963,530 A | 10/1999 | Ward | |
| 6,086,380 A | 7/2000 | Chu et al. | |
| 6,147,940 A | 11/2000 | Yankowski | |
| 6,147,950 A | * 11/2000 | Sakamoto et al. | ............ 369/84 |
| 6,163,508 A | 12/2000 | Kim et al. | |
| 6,201,771 B1 | * 3/2001 | Otsuka et al. | ................ 369/30 |

OTHER PUBLICATIONS

The text of a website which was available at least as early as June of 1998 and which describes a device called "The Little Black Rack".

* cited by examiner

*Primary Examiner*—Tan Dinh
(74) *Attorney, Agent, or Firm*—Trexler, Bushnell, Giangiorgi, Blackstone & Marr, Ltd.

(57) ABSTRACT

Disclosed is a music jukebox which is configured for storing a music library therein. The music jukebox includes a housing, audio input structure on the housing for receiving audio signals, audio output structure on the housing for outputting audio signals, and a data storage structure in the housing for storing audio signals. The music jukebox is configured such that a music library of sound tracks is storable in the data storage structure. The music jukebox includes means for selecting a sound track from the music library stored in the data storage structure to play through the audio output structure, and the housing includes a display thereon which identifies sound tracks in the music library. Preferably, the music jukebox is configured such that the sound tracks stored in the data storage structure are editable before being played through the audio output structure.

48 Claims, 14 Drawing Sheets

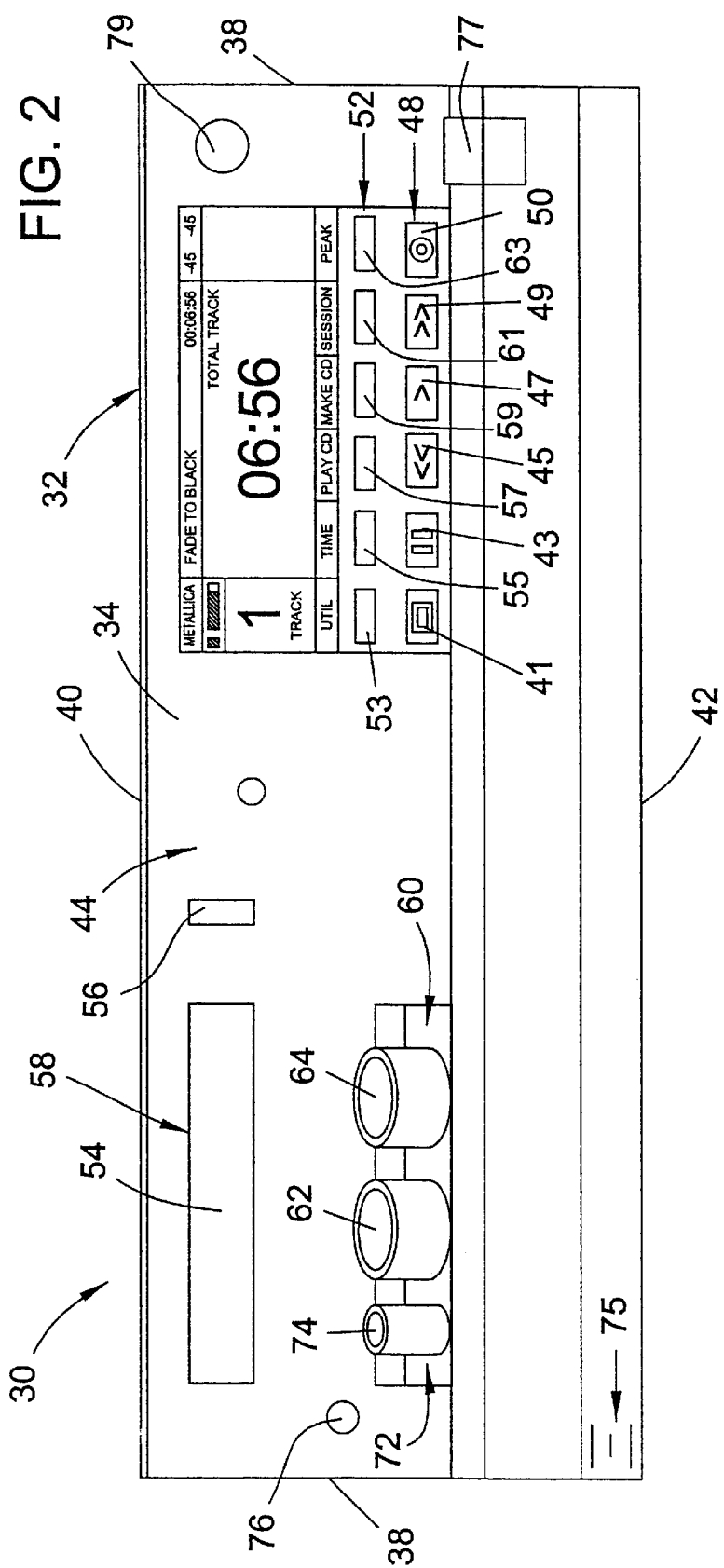

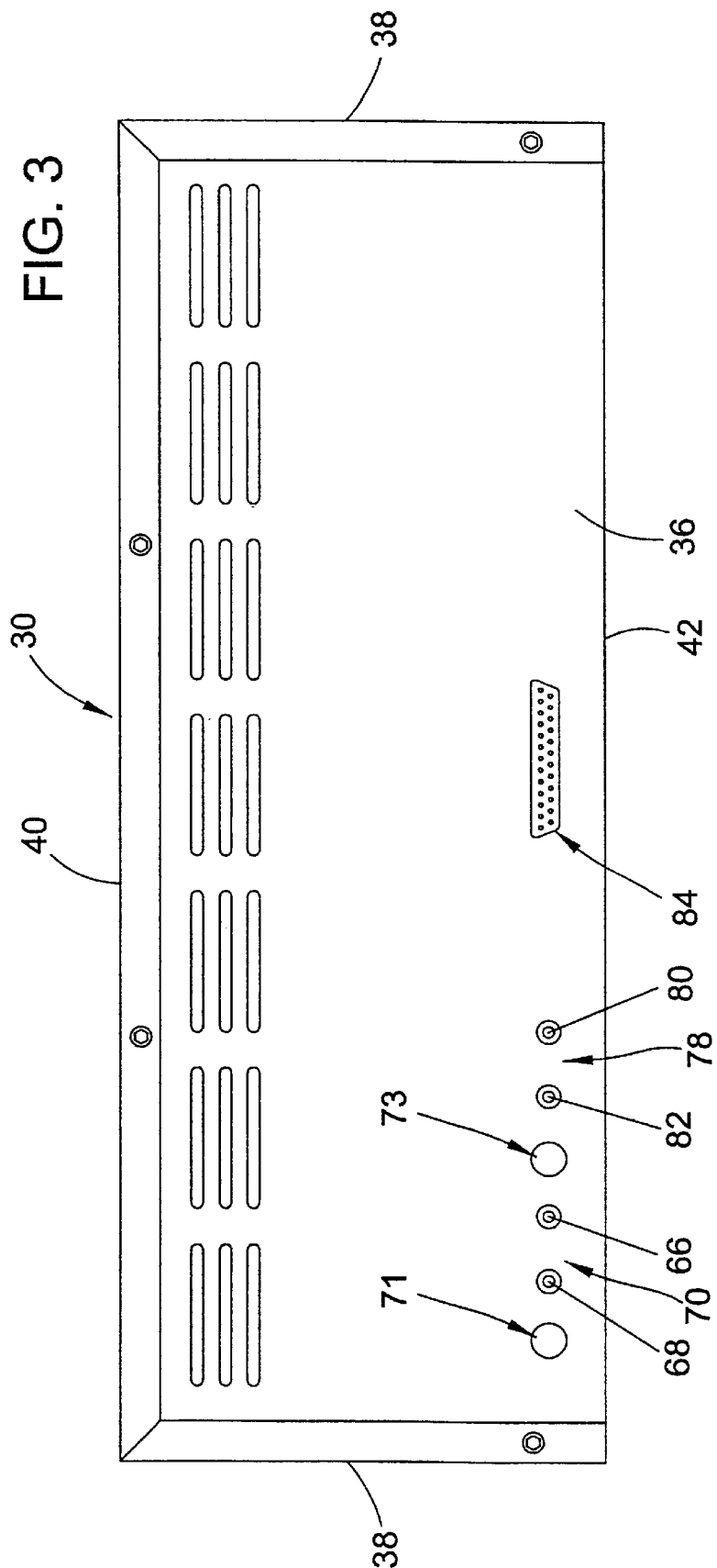

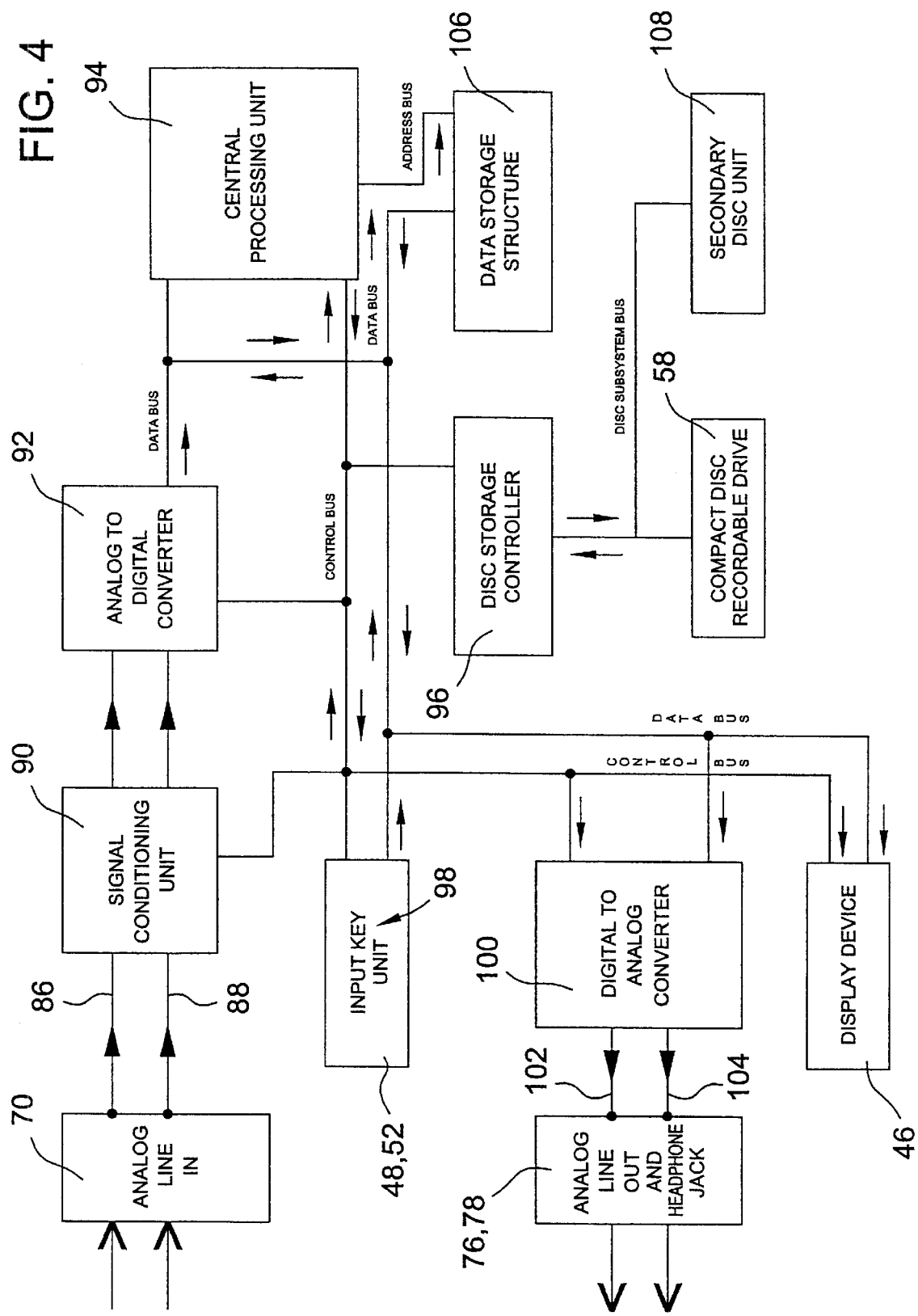

(PART 1)

(PART 2)

MUSIC JUKEBOX

RELATED APPLICATION

This application is a continuation of U.S. patent application Ser. No. 09/111,989, filed Jul. 8, 1998, which claims the benefit of U.S. Provisional Application No. 60/051,999, filed Jul. 9, 1997.

BACKGROUND

The present invention relates generally to audio recording devices, and relates specifically to a novel music jukebox.

Present audio tape recorder/players provide for both audio recording onto a cassette tape and play back of the audio recording, and are generally relatively easy to use. The typical audio tape recorder/player has several push-buttons which allow a user to have the device perform a number of functions in connection with the cassette tape. Normally, a push-button is provided for each of the following functions: pause, stop, rewind, fast forward, play and record.

In addition to being easy to use, some audio tape recorder/players provide additional advantages by way of advanced features. For example, some provide that one can determine a recording sound level before or during a recording, and set or adjust a recording gain level in response thereto. Specifically, some provide a digital display, such as an LED display, that indicates the sound level which will be recorded (or which is being recorded) onto the cassette tape, and provide a rotary knob, or other type of adjustor, which one can adjust in order to set (or adjust) the recording gain level. However, even these more advanced audio tape recorder/players do not provide that one can listen to how the recording actually sounds until after the sounds are recorded onto the tape. In other words, the typical audio tape recorder/player does not allow one to truly "audition" a recording before it is actually recorded onto a cassette tape. As a result, several "takes" may be required before an acceptable recording is obtained. A recording may be unacceptable because of a number of reasons such as, for example, because the recording gain level was set too low or too high.

Additionally, present audio tape recorder/players do not provide an easy way to vary the order in which a set of sounds, such as a set of songs, will appear on the cassette tape. Because an audio tape recorder/player records essentially what it "hears" or receives, in real time, it is not possible to easily customize the order in which sound tracks, such as songs, will appear on the recorded tape.

Another disadvantage of audio tape recorder/players is that they produce analog recordings, and analog recordings have a lower sound quality than do digital recordings. Furthermore, cassette tapes are not as durable as compact discs. For example, a dirty tape head may effectively destroy a cassette tape upon play back. For these reasons, cassette tapes are no longer the standard in the music industry, and compact discs are now en vogue. Therefore, while the demand for audio tape recorder/players has decreased, the demand for compact disc players has been increasing.

Like present audio tape recorder/players, present compact disc players are also relatively easy to use and provide push-button controls, with a push-button being provided for each of the following functions in connection with the compact disc: pause, stop, track reverse, track forward and play. The track reverse and track forward functions of the present-day compact disc player are much like the rewind and forward functions, respectively, of the present-day audio tape recorder/player. However, the nature of compact discs provides that the track reverse and track forward functions of a compact disc player are more useful than the respective rewind and fast forward functions of an audio tape recorder/player. Specifically, holding the track reverse or track forward push-button down provides that the compact disc player skips back or forward, respectively, within a given sound track. In contrast, tapping the track reverse or track forward push-button on the compact disc player provides that the compact disc player very quickly skips back or ahead, respectively, to the previous or next sound track on the compact disc. Because of the general nature of cassette tapes, this latter feature cannot effectively be provided on audio tape recorder/players.

As mentioned, compact disc players provide certain advantages over audio tape players. Compact disc players play back digital sound recordings from a compact disc, and digital sound recordings have a higher sound quality than do analog signal recordings. Also, compact disc players provide for fast movement to the previous or next sound track. However, while audio tape recorder/players provide that one can record onto a cassette tape, most presently generally available compact disc players do not provide that one can record onto a compact disc.

Those compact disc recorders which are generally available record onto a compact disc in real time and do not provide any true editing functions. For example, some compact disc recorders now available provide that a source device, such as a compact disc player or a cassette tape player, is first connected to inputs of the compact disc recorder. Then, as the source device is operated to begin playing music from the source medium, the compact disc recorder is operated to begin recording. Therefore, as the source device is playing music, the compact disc recorder records the music in real time, as the compact disc recorder receives the music through its inputs.

There are many disadvantages to having to record in real time. One disadvantage is that editing is severely limited. If a mistake is made, the mistake is generally non-correctable. For example, if one begins recording the wrong song onto the compact disc or begins recording a song at the wrong volume, the mistake cannot readily be corrected. One would have to start over, and begin recording onto a new compact disc. Another disadvantage to having to record in real time is that if one wishes to make several identical compact discs, one would need to re-play all of the source music into the compact disc recorder. Of course, this effectively provides more opportunities for mistakes to be made while recording. Furthermore, if one wishes to make a second compact disc much like a compact disc which was made previously, with the exception of one song being replaced by another, one would need to re-play all of the previous source music into the compact disc recorder in addition to having to play the new song into the recorder. Likewise, if one wishes to make a second compact disc much like a compact disc which was made previously, with the exception of the songs on the second compact disc appearing in a different sequence, one would need to re-play all of the previous source music into the compact disc recorder, albeit in a different order.

Some other compact disc recorders now available include two compact disc trays—one tray for playing music from a compact disc, and one tray for recording the music onto another compact disc. In other words, music is recorded from tray-to-tray. This type of compact disc recorder presents many of the same disadvantages as discussed above because the recording is still done in real time.

Most of the compact disc recorders presently available can play music from a standard compact disc, thereby operating like a standard compact disc player. However, the devices generally cannot play back music which was received previously by the device unless the compact disc containing that music is first inserted into the tray of the device.

Another disadvantage to the compact disc recorders which are presently generally available is that the devices cannot be used to record onto standard CD-R discs which can be played back using any standard compact disc player. Standard CD-R recordable compact discs (as opposed to discs marked "for consumer use") are presently widely available, are inexpensive, and can be played back using any standard compact disc player.

The present invention is directed at solving the disadvantages discussed hereinabove.

OBJECTS AND SUMMARY OF THE DISCLOSURE

A general object of the present invention is to provide a music jukebox which provides advantages not generally provided by other presently available compact disc recorders.

Another object of the present invention is to provide a music jukebox which can be used to store music tracks as easily as using a modem-day audio tape recorder/player.

A further object of the present invention is to provide a music jukebox that provides that one can listen to a stored sound track before the sound track is recorded onto a compact disc (i.e. truly "audition" a recording).

Still another object of the present invention is to provide a music jukebox that provides that one can easily customize the order in which sound tracks will appear on a compact disc.

Yet still another object of the present invention is to provide a music jukebox that can play back music which was received previously by the device without a compact disc containing that music being first inserted into the device.

Yet a further object of the present invention is to provide a music jukebox that can be used to record onto computer-compatible compact discs which are presently widely available, are inexpensive, and can be played back using a standard compact disc player.

Briefly, and in accordance with at least one of the foregoing objects, the present invention envisions a music jukebox which is configured for storing a music library therein. The music jukebox includes a housing, audio input structure on the housing for receiving audio signals, audio output structure on the housing for outputting audio signals, and a data storage structure in the housing for storing audio signals. The music jukebox is configured such that a music library of sound tracks is storable in the data storage structure. The music jukebox includes means for selecting a sound track from the music library stored in the data storage structure to play through the audio output structure, and the housing includes a display thereon which identifies sound tracks in the music library.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 2 is a view of the front of the music jukebox illustrated in FIG. 1;

FIG. 3 is a view of the back of the music jukebox illustrated in FIGS. 1 and 2;

FIG. 4 is a simplified block diagram of the internal components of the music jukebox illustrated in FIGS. 1 and 2;

DESCRIPTION

Figure 1:
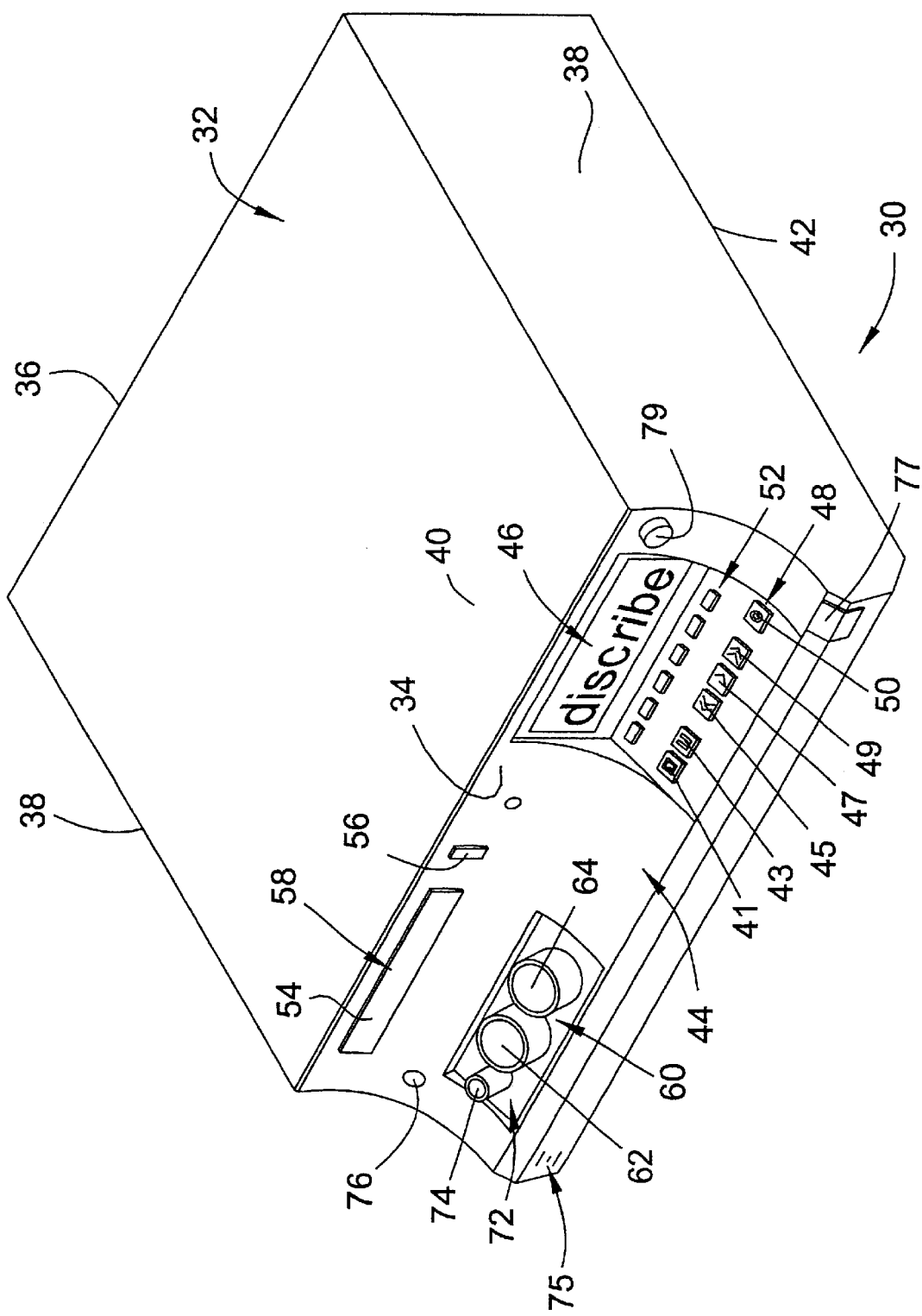
FIG. 1 is a perspective view of a music jukebox in accordance with an embodiment of the present invention.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Shown in FIG. 1 is an optical storage device in the form of a music jukebox or compact disc recorder 30 in accordance with an embodiment of the present invention. The music jukebox 30 is a easy-to-use stand-alone audio recording device that can receive signals from an analog audio source and produce digital recordings onto a compact disc. As will be described, the music jukebox 30 has memory so sound tracks can be stored therein and selectively played back. In this regard, the compact disc recorder 30 can be effectively employed as a modern-day juke box. Hence, in the following description, the device 30 is interchangeably referred to as a compact disc recorder and music jukebox. Additionally, the fact that the compact disc recorder 30 includes memory provides that saved sound tracks can be reviewed, or "auditioned", before being burned onto a compact disc. Preferably, the compact disc recorder 30 has many enhanced functions allowing for the advanced editing of stored sound tracks, and can be used to play back standard, commercially available compact discs. These advantages as well as many others will be apparent after reading the following description of the compact disc recorder 30.

Internal components of the compact disc recorder 30 are protected by a housing 32, which may be a fabricated metal case much like those of standard stereo decks such as cassette decks and compact disc players. As shown in FIG. 1, the housing 32 has a front panel 34, a back panel 36, sides 38, a top 40 and a bottom 42. The housing 32 may incorporate, or have attached thereto, standard computer bay/mounting hardware, such as rails for drive mounting, one or more slots for circuit board mounting, and other mounting attachment structure.

As shown in FIGS. 1 and 2, the front panel 34 of the compact disc recorder 30 is an injection-molded front bezel 44 which provides, essentially, a user interface which displays information to a user and provides means for allowing the user to program and control the compact disc recorder 30. The front bezel 44 has a digital graphic display device 46 thereon. The digital graphic display unit 46 is, for example, a 240×64 dot graphics LCD with LED back-light, or may be a type of plasma display and/or a group of lamp devices. Regardless, the digital graphic display device 46 provides that the compact disc recorder 30 can communicate certain information to the user in connection with the operation, control and programming of the compact disc recorder 30. In addition, the digital graphic display unit 46 may also be a graphic user interface, such as a touch screen whereby a user can operate, control and program the compact disc recorder 30 by physically touching the digital graphic display unit 46 with a finger, light pen, or some other object.

The front bezel 44 also provides a means to give editing commands to embedded software (to be discussed later herein) for ordering, auditioning and playing back sound tracks stored in the compact disc recorder 30, prior to recording the tracks onto a compact disc. Specifically, the front bezel 44 has a set 48 of six transport control push-buttons 41, 43, 45, 47, 49, 50 thereon for providing that the user can control the functioning of the compact disc recorder 30. The set 48 of push-buttons are identical to those typically found on present-day compact disc players, but also includes a push-button to direct the compact disc recorder 30 to enter a record mode as will be described more fully later. In other words, there is a separate push-button provided for each of the following functions of the compact disc recorder 30: stop (button 41), pause (button 43), reverse track (button 45), play (button 47), forward track (button 49) and record (button 50). The front bezel 44 also includes a second set 52 of six push-buttons 53, 55, 57, 59, 61, 63 each of which relates to certain functions of the compact disc recorder 30 relating to programming the compact disc recorder 30 and editing sound tracks previously stored therein. Preferably, the second set 52 of push-buttons allows a user to access and interact with menus displayed on the digital graphic display device 46. This will be described in more detail later herein. Preferably, both sets 48 and 52 of push-buttons on the front bezel are illuminated, such as by LEDs.

The front bezel 44 also includes optical storage medium receiving structure so that an optical storage medium may be inserted into an optical storage drive. As shown, the optical storage medium receiving structure and optical storage drive may comprise a compact disc tray 54 and a compact disc tray eject/retract button 56 where the compact disc tray 54 forms a portion of a compact disc recordable drive 58 (see FIGS. 4 and 5) that is housed within the housing 32 of the compact disc recorder 30. Pressing the compact disc tray eject/retract button 56 one time provides that the CD tray 54 on the front bezel 44 opens and extends to allow the insertion of a compact disc into, or the removal of a compact disc from, the compact disc recordable drive 58 housed within the housing 32 of the compact disc recorder 30. Pressing the compact disc tray eject/retract button 56 again provides that the compact disc tray 54 on the front bezel 44 retracts and closes to provide that the compact disc recordable drive 58 can interact with the compact disc. Alternatively or additionally, the compact disc recorder may be configured such that one of the push-buttons can be used to open and close the compact disc tray 54. The compact disc recordable drive 58 may be provided such that a plurality of compact discs may be inserted therein. To this end, the compact disc tray 54 may open to provide access to more than one compact disc, or the compact disc recordable drive 58 may have more than one compact disc tray 54. Instead of a compact disc recordable drive 58, the device may include some other type of optical storage device such as a DVD recorder.

Further, the front bezel 44 includes analog/digital controls, thus providing a means to operate a recording, or input, signal level and the play back, or output, signal level. Specifically, the front bezel 44 may include gain adjustors 60 thereon comprising two single-turn rotary potentiometers 62 and 64 for controlling the input gain of each of the right and left channels, 66 and 68, respectively, of a line-in jack 70, which, as shown in FIG. 3, is on the back panel 36 of the compact disc recorder 30. Indicia may be provided on the front bezel 44 in the vicinity of the gain adjustors 60 to indicate which adjustor 60 corresponds to the right channel, and which adjustor 60 corresponds to the left channel. As shown in FIGS. 1 and 2, the front bezel 44 also includes a volume adjuster 72 which comprises a dual-turn rotary potentiometer 74 for controlling the output volume to a headphone jack 76, also located on the front bezel 44. Preferably, the headphone jack 76 on the front bezel 44 consists of a standard one-quarter inch; gold-plated three conductor stereo headphone jack. Additionally, as shown, the front bezel 44 may include a remote control signal receiving window 77 for receiving and/or sending signals to and/or from a remote control which may include buttons corresponding to either or both sets 48 and 52 push-buttons provided on the front bezel 44 of the compact disc recorder 30 as well as a display screen. Finally, also included on the front bezel 44 of the compact disc recorder 30 is a power switch 79 which may be illuminated with an LED like the other push-buttons on the front bezel 44. As shown, the front bezel 44 may also include a microphone 75 for receiving a user's voice and operating in response thereto.

As mentioned, and as shown in FIG. 3, the back panel 36 of the compact disc recorder 30 includes a line-in phono jack 70 having a right channel 66 and a left channel 68. The line-in jack 70 provides that the compact disc recorder 30 can receive stereophonic signals from an external source, such as from a tape deck, a compact disc player, a stereo radio receiver, or practically any other analog audio source. The back panel 36 of the compact disc recorder 30 also includes a line-out jack 78 having a right channel 80 and a left channel 82. The line-out jack 78 provides that the compact disc recorder 30 can transmit stereophonic signals to a pre-amplifier or amplifier, such as to a stereo radio receiver, or even to a standard cassette deck. Preferably, each of the line jacks 70 and 78 is a standard RCA jack having about 10,000 Ohms of impedance, and is color-coded for stereo connection to an existing stereo system. For example, the right channels 66 and 80 may be colored red, and the left channels 68 and 82 may be colored white. Indicia may also be provided in the vicinity of the jacks 70 and 78 to indicate the respective channels thereof As shown, there may also be provided balanced input jacks 71 and 73.

The back panel 36 also includes a power supply cord (not shown) that can be plugged into a common household electrical outlet to provide power to the compact disc recorder 30 when the power switch 79 on the front bezel 44 is pressed. Depending on the configuration of the compact disc recorder 30, the power supply cord can be provided to operate either with a 115 Volt/60 Hz electrical outlet which is commonly found in United States households, or with a 230 Volt/50 Hz electrical outlet which is commonly found in other countries.

As mentioned, the back panel 36 preferably includes standard RCA input jacks 66 and 68 as well as balanced inputs 71 and 73. In addition to, or instead of, these input lines, the back panel 36 may also include a single line stereo input. Also, in addition to, or instead of, the headphone jack 76 and the line-out jack 78, the back panel 36 may also include a single line stereo output. The single line stereo input and output may each comprise a standard, one-eighth inch TRS stereo jack. The single line stereo input would provide that the compact disc recorder 30 can receive both channels of an external sound source through a single jack. Likewise, the single line stereo output would provide that the compact disc recorder 30 can transmit both channels of a stereo signal through a single jack. The back panel 36 may, of course, include still other lines in and out. For example, the back panel 36 may include a standard one-eighth inch mono combination line/microphone input jack. In fact, the one or more input lines in and out may be provided on the front bezel 44 in addition to, or instead of, the back panel 36. The number of inputs and outputs and locations thereof is not imperative. Furthermore, an amplifier can be provided in the compact disc recorder 30, and speaker output jacks can be provided on the back panel 36.

Regardless of the type of lines in and out provided, one having ordinary skill in the art would recognize that a corresponding gain or volume adjustor may be provided associated therewith. Alternatively, it can be provided that the gain of all the available inputs can be controlled by the gain adjustors 60 specifically shown in FIGS. 1 and 2, such that a single knob controls the gain for a plurality of inputs. Likewise, it can be provided that the volume of all the available outputs can be controlled by the volume adjustor 72 specifically shown in FIGS. 1 and 2, such that a single knob controls the volume for a plurality of outputs. Of course, all adjustors can be provided electronically, such as on the digital graphic display device 46.

As shown in FIG. 3, furthering the versatility of the compact disc recorder 30, the back panel 36 thereof includes a SCSI port 84. The SCSI port 84 provides that the compact disc recorder 30 can communicate with a personal computer (PC) to create or duplicate multi-media CD-ROMs, or backup and restore data onto a PC. To this end, the SCSI port 84 provides active termination and a thumb-wheel (not shown) is preferably provided in association therewith to allow the user to identify the device number (generally from zero to six) the PC should regard the compact disc recorder 30. To connect to a PC, a SCSI interface cable is connected to both the SCSI port 84 on the compact disc recorder 30 and to a SCSI card on the PC. To select the SCSI functionality of the compact disc recorder 30, a selector switch can be provided on the front bezel 44 or back panel 36 of the device 30. Alternatively, the compact disc recorder 30 may be configured such that the display device 46 and one of the input keys 52 can be used to select the SCSI function of the device 30. Still further, the compact disc recorder 30 may be configured for automatically sensing that a PC is connected to the SCSI port 84, and automatically responding thereto by entering a SCSI mode.

The internal components and connections of the compact disc recorder 30 will now be described with reference to FIG. 4. As shown, two input lines 86 and 88 are connected to a signal conditioning unit 90. The input lines 86 and 88 represent analog signals received from one or more of the inputs mentioned hereinabove, such as from the right and left channels 66 and 68, respectively, of the line-in jack 70, from the balanced inputs 73 and 71, from the single line stereo input and/or from a combination line/microphone input jack. The signal conditioning unit 90 modifies the gain and frequency response of the analog signals carried by the input lines 86 and 88 in order to optimize same for input to an analog-to-digital converter 92, which is connected to the signal conditioning unit 90. The signal conditioning unit 90 is not only connected to the analog-to-digital converter 92, but also to a control bus. A central processing unit 94, such as a microprocessor having software embedded therein, is incorporated on a circuit board along with a sound card (CODEC) structure, a SCSI interface and all principal input and output connections, and is also connected to the control bus. Preferably, the embedded command structure is based on the standard SCSI operating commands for CD-R devices. The connection of the central processing unit 94 to the control bus provides that the central processing unit 94 can control all the other devices which are connected to the control bus, such as the signal conditioning unit 90. The signal conditioning unit 90 modifies the gain and frequency response of the analog signals carried by the input lines 86 and 88 under control of the central processing unit 94 over the control bus.

As shown, in addition to being connected to the signal conditioning unit 90, the analog-to-digital converter 92 is also connected to the control bus. The analog-to-digital converter 92 samples each of the analog input signals received from the signal conditioning unit 90, and converts the analog signals to digital data, or a digital word. The analog-to-digital converter 92 performs this function under control of the central processing unit 94 over the control bus.

Also connected to the control bus is a disc storage controller 96, and the disc storage controller 96 is also connected to a disc subsystem bus to which is connected the compact disc recordable drive 58 and possibly a secondary compact disc recordable drive 108, if provided. The secondary disc recordable drive 108 may be identical to the compact disc recordable drive 58, or may comprise a means to store and/or read digital information on or from a magnetic or optical disc. For example, the secondary disc recordable drive may comprise a DVD recorder. In fact, the compact disc recordable drive 58 may comprise a DVD recorder, and a secondary recordable drive need not even be provided. However, should there be included a secondary disc recordable drive 108 which is identical to the compact disc recordable drive 58, the front bezel 44 may include a second compact disc tray, and a second compact disc tray eject/retract button associated therewith, or may provide that the single compact disc tray 54 can provide a compact disc to both of the compact disc recordable drives 58 and 108. The disc storage controller 96 essentially amounts to an interface between the data storage or retrieval requests from the central processing unit 94 and the disc subsystem bus. To facilitate the control and programming of the central processing unit 94 itself, an input key unit 98, essentially comprising the two sets 48 and 52 of previously-described user interactive switches on the front bezel 44 of the compact disc recorder 30, is connected to the control bus. The digital graphic display device 46 located on the front bezel 44 of the compact disc recorder 30 is also connected to the control bus; therefore, the central processing unit 94 can control and drive the digital graphic display device 46.

Also connected to the control bus is a digital-to-analog converter 100. Therefore, the central processing unit 94 can control the operation thereof over the control bus. Specifically, the digital-to-analog converter 100 converts digital input received from a data bus under control of the central processing unit 94. As shown, connected to the digital-to-analog converter 100 are two output lines 102 and 104 for communicating the produced analog signals to any of the outputs already mentioned, namely, the right and left channels 80 and 82, respectively, of the line-out jack 78, the single line stereo output, the headphone jack 76, any balanced outputs provided, or any other outputs provided on the device 30. Should the function selector switch (or other means of setting the function of the compact disc recorder 30, if not automatically detected by the compact disc recorder 30) be set to select the SCSI device function of the compact disc recorder 30, a digital signal output would bypass the digital-to-analog converter 100 and proceed directly to the SCSI port 84 and then to a connected PC.

As shown, the analog-to-digital convertor 92 is also connected to a data bus. Additionally, the SCSI port 84 is connected to the data bus along with the central processing unit 94. This provides that the digital signal input received through the SCSI port 84 can proceed to the central processing unit 94 without having to travel through the analog-to-digital converter 92. In this case, the function selector switch (or other means of setting the function of the compact disc recorder 30, if not automatically detected by the compact disc recorder 30), if provided, would be set to select the SCSI function of the compact disc recorder 30. Also connected to the data bus is one or more data storage structures 106, the input key unit 98, the digital-to-analog converter 100 and the digital graphic display device 46. The one or more data storage structures 106 may comprise essentially any type of data storage structure for storing and retrieving digital information from randomly addressable memory locations using solid state read only and/or read and write types of memory. Specifically, the one or more data storage structures 106 may each comprise an IDE hard drive having a capacity of 2.1 or more gigabytes. As shown, the central processing unit 94 and one or more data storage structures 106 are interconnected via an address bus and a data bus.

Embedded in at least one of the data storage structures 106, and preferably supplied on a separate back-up CD-ROM, is operating software which includes operating system and command/control code, thus providing means for causing and directing the various components of the compact disc recorder 30 to perform specified functions, including re-boot, diagnostic and installation procedures. Preferably, the code on the CD-ROM is licensed to the specific end user and is keyed to the serial number of the specific compact disc recorder 30 with which it is shipped. In the event that the portion of the code provided embedded in the data storage structure 106 becomes accidentally damaged, the user can insert the back-up CD-ROM into the compact disc tray 54 of the compact disc recordable drive 58 prior to providing power to the compact disc recorder 30. When power is provided thereto, this will result in the testing and any necessary correcting of the data storage structure 106 and of the operating system and command structure. Thus, except in the case of complete data storage structure 106 failure, or other component failure (which would preferably be detected by the central processing unit 94 using the code on the back-up CD-ROM, thus displaying an appropriate error message on the digital graphic display unit 46), preferably no other diagnostic or system-related maintenance is necessary.

Figure 5A:
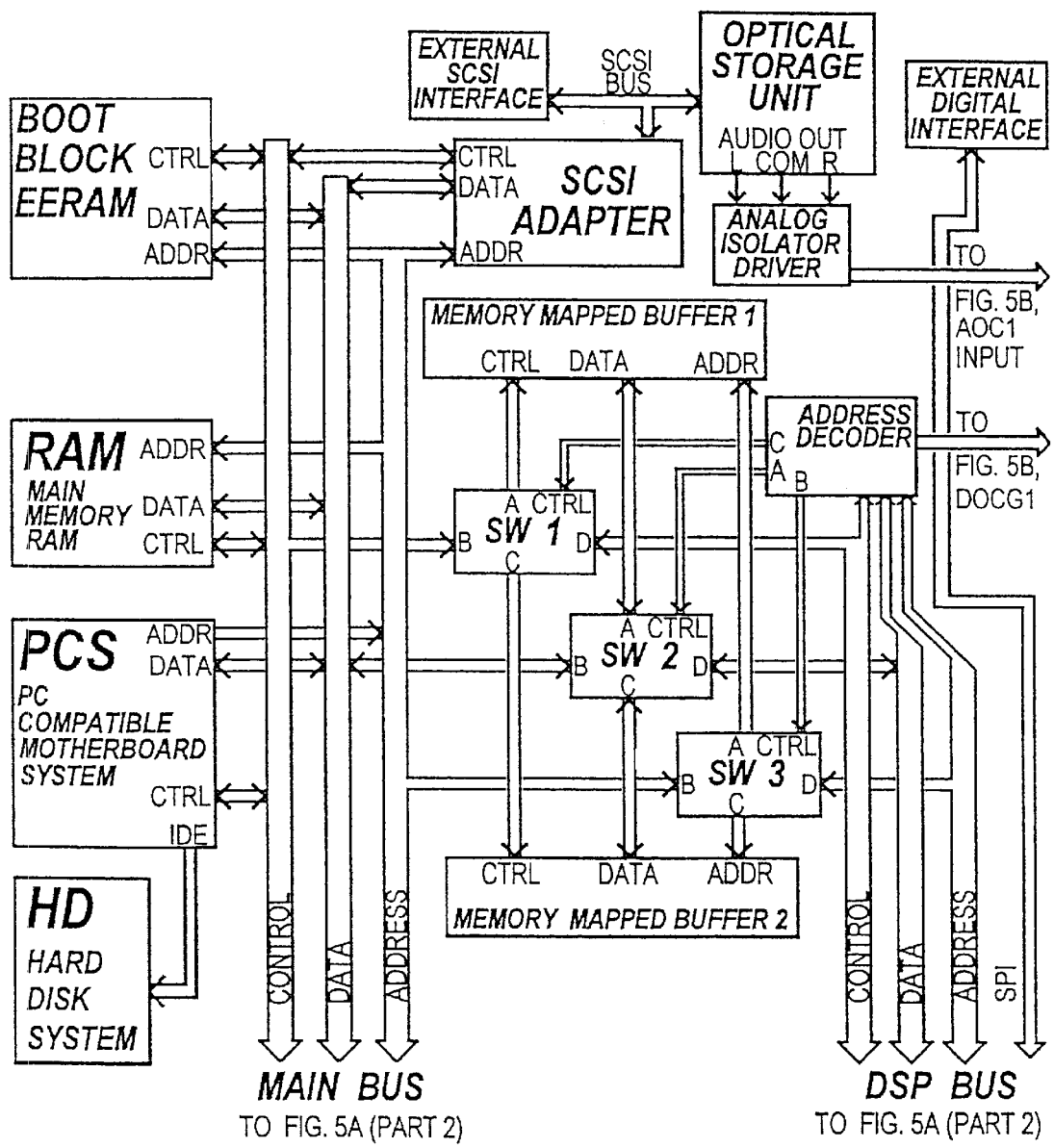
FIG. 5a is the left half of a more detailed block diagram of the internal components of the music jukebox illustrated in FIGS. 1 and 2.
Figure 5A:
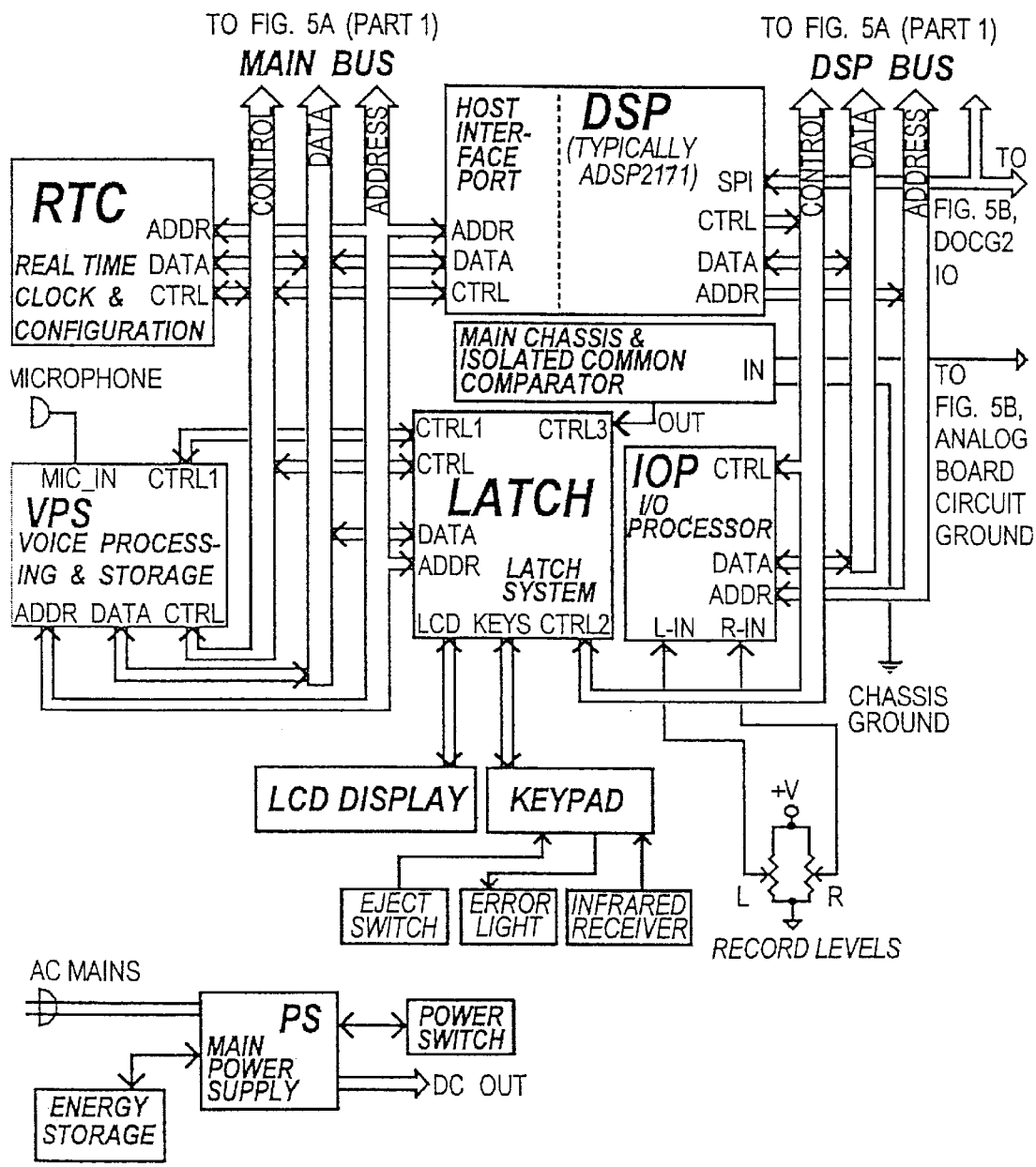
Figure 5B:
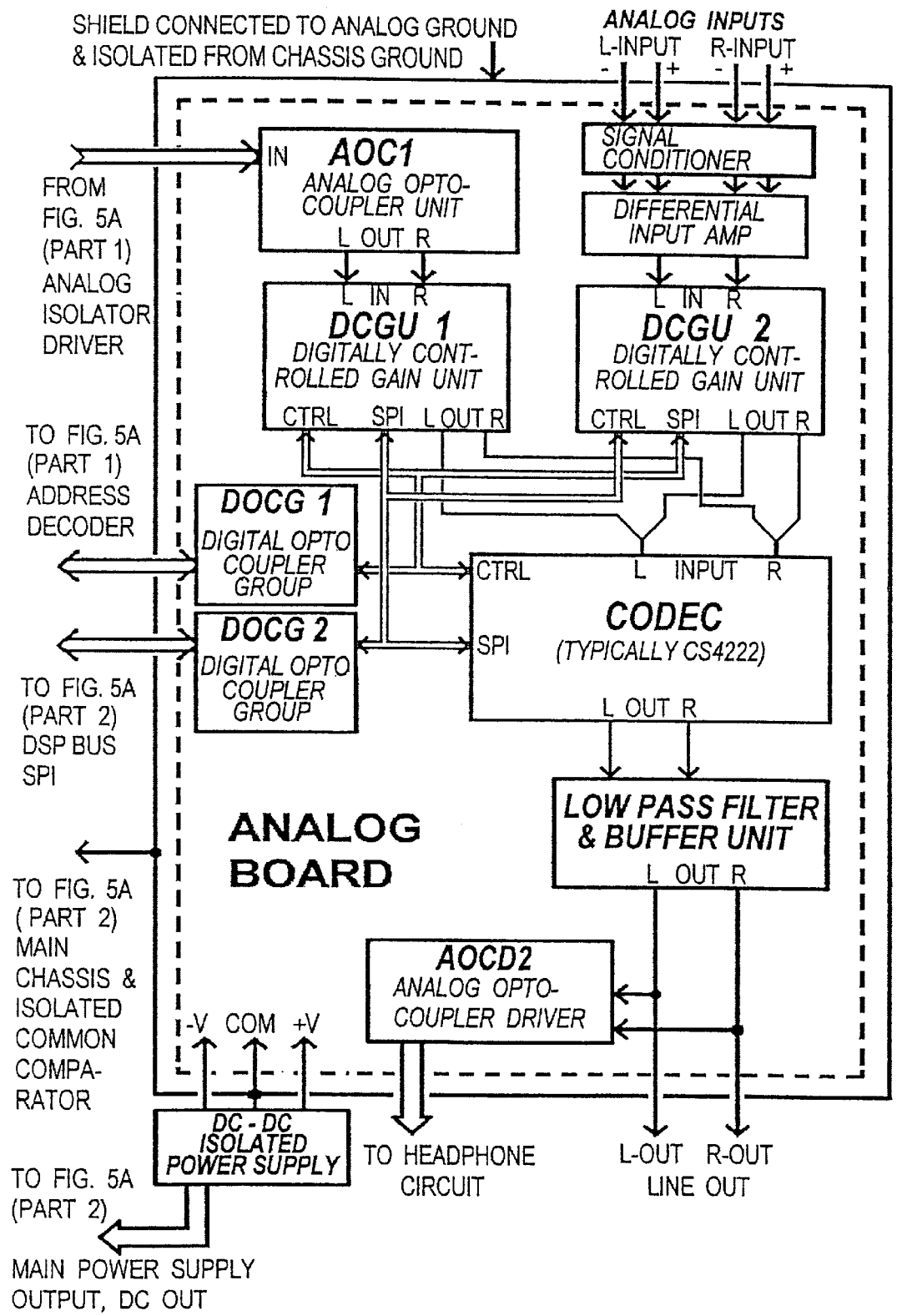
FIG. 5b is the right half of a more detailed block diagram of the internal components of the music jukebox illustrated in FIGS. 1 and 2.
Figure 6:
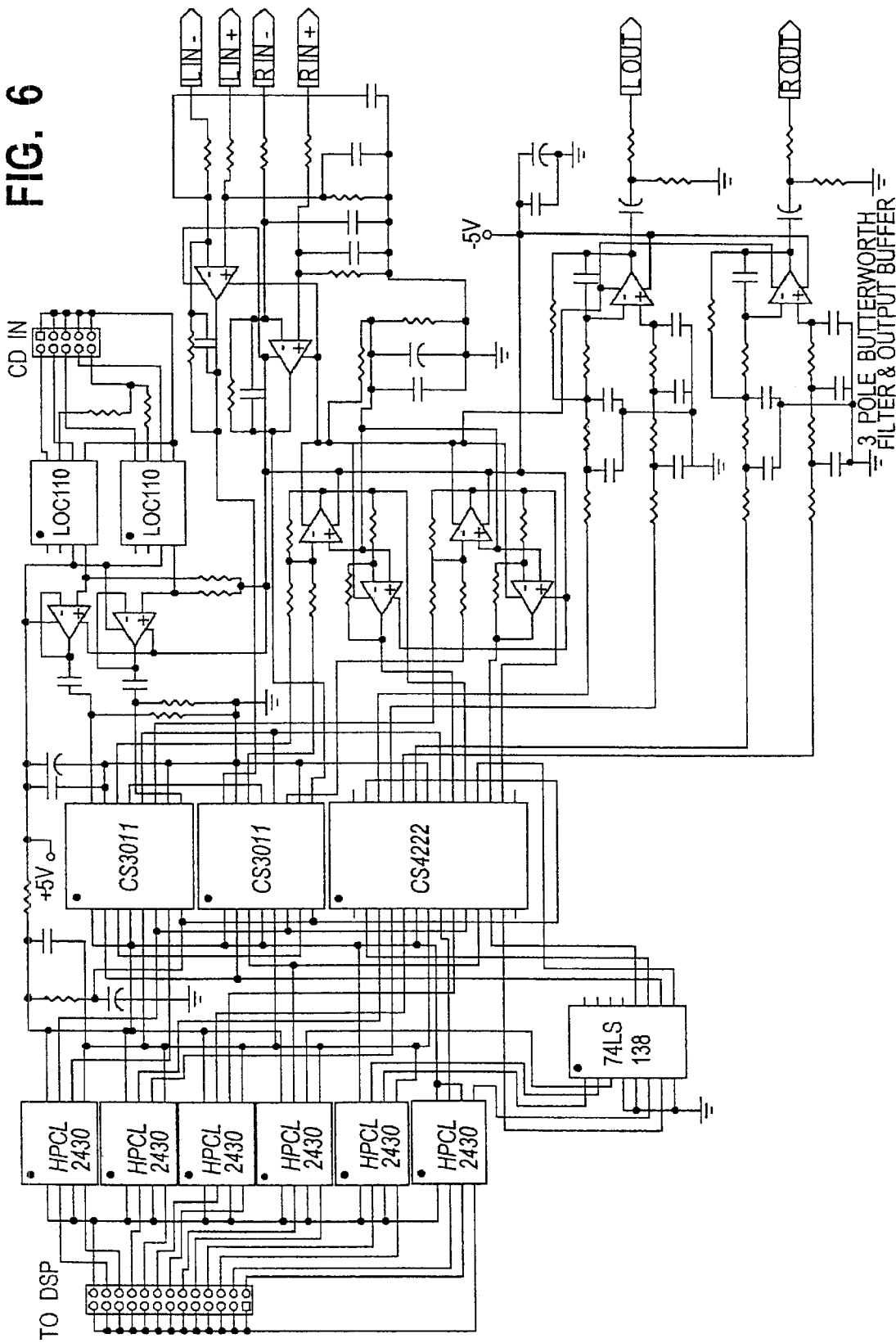
FIG. 6 is a circuit diagram of analog components of the music jukebox illustrated in FIGS. 1 and 2.

FIGS. 5a, 5b and 6 are detailed views of the internal components of the compact disc recorder 30. Specifically, FIG. 5a illustrates digital components and FIG. 5b illustrates analog components of the compact disc recorder 30 in a simplified form. FIGS. 5a and FIGS. 5b essentially form a single block diagram, with FIG. 5a being the left half, and FIG. 5b being the right half. FIG. 6 illustrates analog components of the compact disc recorder 30 in more detail than does FIG. 5b.

As shown in FIG. 5a, the basic system will use a PC compatible board or chip (system on a chip, such as the STPC presently available from ST Microelectronics) running the compact disc recorder 30 software as an embedded system, to provide overall control of the assorted circuit elements. Such a system will be referred to hereinafter as a PCSystem [PCS]. The PCS will communicate with the rest of the system by means of a Main BUS (a bus meaning a grouping of conductors which is routed to the same parts of a circuit, such as an ISA or PCI type), each containing a Data, an Address and a Control sub-bus. The Main Bus, an ISA BUS in this case, is primarily controlled by the PCS and will connect the PCS to the DSP (such as a ADSP2111 DSP presently available from Analog Devices), Main Memory Ram [RAM], Boot Block Eeram, Real Time Clock & Configuration [RTC], Voice Processing & Storage [VPS], Latch System [LATCH], SCSI adapter [SCSI] and Memory Mapped Buffer System [BUFFER, including Memory Mapped Buffers 1 and 2 as illustrated in FIG. 5a]. There is a secondary bus referred to as the DSP BUS, which is primarily controlled by the DSP and connects the DSP to the BUFFER through bank switches SW1, SW2, and SW3, to the ANALOG BOARD through Digital OptoCouplers, and to the LATCH, and to the I/O PROCESSOR [IOP]. A third BUS, called the Serial Interface Bus [SPI] only connects to the ANALOG BOARD (shown in FIG. 5b), through Digital OptoCouplers, and passes data back and forth from the DSP and the CODEC (on the Isolated Analog Board). The SPI, together with the Analog Board Control Bus, also controls the DIGITALLY CONTROLLED GAIN UNITS [DCGU 1 and DCGU 2] (see FIG. 5b) and provides for connection to an External Digital Interface (which may be utilized in a Professional Unit). A fourth BUS, called the IDE BUS connects the HARD DISK SYSTEM [HD] to the PCS. A fifth BUS called the SCSI BUS connects the SCSI ADAPTER to the compact disc recordable drive 58.

With application of Mains Power to the Main Power Supply [PS], the PS will first supply power and then a power good signal to the PCS. The PCS will initialize under Bios control, perform power on tests, and then load the compact disc recorder 30 imbedded Operating System [AADOS] from the EERAM. The application of Power will cause the data storage structure 106 (HD in FIG. 5a) and compact disc recordable drive 58 to initialize. The AADOS will then initialize LATCH, IOP, RTC and VPS. The AADOS will then initialize the DSP and then load the DSP operating system [DSP CODE] into the DSP through the DSP Host Interface Port [HIP]. The DSP will then establish communications with the CODEC and DCGU's. The AADOS will initialize the LCD and display the start screen and begin normal operation in a ready mode, waiting for User input.

The EERAM which boots the AADOS can be reconfigured and rewritten under control of the PCS, thereby allowing for the complete operating system to be upgraded at will.

The BUFFER comprises BUFFER1 and BUFFER2, bus switches SW1, SW2 and SW3, and an ADDRESS DECODER. These units comprise a method to map one half of the total BUFFER, BUFFER1 for instance, into the memory address space of the PCS while, at the same time mapping the other buffer, BUFFER2, into the memory address space of the DSP.

In the record mode, the CODEC (such as a Crystal CS4222) converts the Audio Input Signals into Digital Data and passes the data through the SPI to the DSP, which will store the data (after first perhaps processing it in some way) to BUFFER2, in this instance, until the buffer is full. While BUFFER2 was filling, the PCS was storing the data which was previously placed in BUFFER1 to the HARD DISK SYSTEM and/or the SCSI subsystem. After BUFFER2 has been filled the DSP switches the bus switches, SW1, SW2, and SW3, which now maps BUFFER2 into the memory address space of the PCS and maps BUFFER1 into the memory address space of the DSP. The DSP then begins to fill BUFFER1 with data from the CODEC and the cycle continues. In playback mode the flow of data is reversed and originates as Digital Data from the HARD DISK SYSTEM or the SCSI storage system, follows the same path in reverse, and is output from the CODEC as Audio (or additionally as a digitally coded audio signal, typically a SPDIF signal).

While in Record, Playback or Stop mode, the VPS can be activated and a voice message [SLATE] can be input through the microphone to the VPS, digitized, and stored as a voice bandwidth (typically 11.025 k) file which is linked to the current track.

The RTC will store the correct time, date and configuration while the compact disc recorder 30 is off, and will have the capability to start and stop recording while unattended.

Operation of the compact disc recorder 30 will now be described. Upon powering the device 30, the central processing unit 94 first initializes the digital graphic display unit 46 (unless there is a fatal system error) and all the user-interactive buttons and knobs such as the push-buttons 48, the soft-key keyboard set 52, and the gain and volume adjustors, 60 and 72. After this initialization, the central processing unit 94 tests the RAM (see FIG. 5). Should a problem with the RAM be detected, an appropriate error message would preferably be displayed on the digital graphic display unit 46 on the front bezel 44 of the compact disc recorder 30. Should no problem be detected, the central processing unit 94 proceeds to test the one or more data storage structures 106, to determine whether the operating system code embedded therein is intact. If the operating system code is completely intact, the code is loaded into the RAM and a specified start-up application is loaded and run. Should the operating system code not be completely intact, the central processing unit 94 checks the compact disc recordable drive 58 to determine whether the back-up CD-ROM, a Boot CD, is inserted in the compact disc tray 54. If not, the central processing unit 94 preferably displays an appropriate error message on the digital graphic display unit 46 and awaits for the insertion of a Boot CD into the compact disc tray 54. When the Boot CD is detected, the central processing unit 94 restores the data storage structure 106, and performs a cold boot.

Then, the central processing unit 94 initializes all the hardware of the compact disc recorder 30 (see specifically FIGS. 4, 5a and 5b). Then, the central processing unit 94 determines whether the compact disc recorder 30 is to be used as an external SCSI device for a PC. To this end, the central processing unit 94 may check to determine whether an interface cable is connected to the SCSI port 84 on the back panel 36 of the compact disc recorder 30, or may check to determine the setting of a function selector switch provided on the front bezel 44 or back panel 36. Of course, as mentioned, other means may be provided to direct the functioning of the compact disc recorder 30 between being a SCSI device and being, for example, a compact disc recorder/player for a common stereo system. If the central processing unit 94 determines that the compact disc recorder 94 is to be used as an external SCSI device, the compact disc recorder 30 enters a SCSI mode, and if the central processing unit 94 determines that the compact disc recorder 94 is to be used otherwise, the central processing unit 94 preferably updates the display on the digital graphic display unit 46 and enters an idle mode waiting for user interaction.

After pressing the Record button 50, when the compact disc recorder 30 receives analog input signals received by any of the analog inputs of the compact disc recorder, the signal conditioning unit 90, under control of the central processing unit 94, modifies the gain and frequency response of the analog signals in order to optimize the analog input signals for input to the analog-to-digital convertor 92. The analog-to-digital convertor 92 samples each of the analog input signals received from the signal conditioning unit 90, and converts the analog input signals to digital data, or a digital word. The analog-to-digital convertor 92, under control of the central processing unit 94, then places the digital data, or digital word, on the data bus at the proper time. Thereafter, the central processing unit 94 can cause the digital data to be saved in the data storage structure 106 as one or more digital files, such as digital audio wavetable (.wav) or raw (.raw) files, in the order in which they were received. Preferably, an operating system embedded in the central processing unit 94 together with the embedded command software enable the user to focus on selection and ordering of audio material (to be described later herein), rather than on the technical aspects of typical pre-mastering and mastering software. Preferably, the only settings the user must make are overall recording level and balance, and even these functions can be programmed such that these are set automatically by the central processing unit 94. Other functions which may be automatically performed by the central processing unit 94 include trimming the lead and/or tail from a take, fading in or out a take, slating a take, setting the equalizing levels for a recording session or even for particular sound tracks within a session, supporting multiple sessions stored in the data storage device 106, and permitting the composing of a session from a library of takes. Many of these functions as well as others will be described more fully later herein in connection with the digital display 46 and set 52 of push-buttons.

After digital data has been saved in the data storage structure 106 as one or more digital files, the digital files can be auditioned, or reviewed, before being saved onto a compact disc, such as a CD-R or CD-RW, which has been inserted in the compact disc tray 54 of the compact disc recordable drive 58 and/or a secondary optical storage device 108 such as a secondary compact disc recordable drive or a DVD recorder. To facilitate the auditioning of the digital files and the discrete ordering thereof prior to recording onto a compact disc, each sound track, or digital file, is maintained as a separate file. Alternatively, the one or more digital files can be saved onto a compact disc without first auditioning same. To audition one or more digital files, a user would interact with specific controls on the front bezel 44 of the compact disc recorder 30, such as the set 48 or 52 of push-buttons or directly with the digital graphic display unit 46 if a touch screen is provided. Alternatively, a microphone 75 may be provided on the front bezel 44 and the device operated by voice.

As mentioned, preferably the pressing any of the push-buttons on the front bezel 44 essentially amounts to interaction with the input key unit 98 identified in FIG. 4. The input key unit 98 enables user interaction with the program control of the compact disc recorder 30. Should the user program or direct the compact disc recorder 30 to audition one or more digital files, the central processing unit 94 would cause the one or more digital files to be forwarded to the digital-to-analog converter 100 over the data bus. The digital-to-analog converter 100 converts this digital data received over the data bus to analog signals, processes the signals to reduce or eliminate any effects from a digital clock supplied by the central processing unit 94, and distributes the analog signals as the two output lines 102 and 104, all under control of the central processing unit 94. Thereafter, as mentioned, the two output lines 102 and 104 can emit the analog signals from any or all of the outputs 76, 78 of the compact disc recorder 30 which have already been described. All conversions of the analog signals to and from digital data are performed in a hard-wired environment. This virtually eliminates the possibility that one or more files will be corrupted during the conversions. As will be described, during auditioning, a user can, for example, play the take or delete the take as well as assemble the take into one or more sessions.

Either before or after auditioning the digital data and possibly after rearranging the order of the individual digital files, the user may direct or program the compact disc recorder 30 to record, or burn, an image of sound tracks (digital data) stored in the data storage structure 106 onto a compact disc. As will be described more fully later herein, to do so, the user would again interact with specific controls on the front bezel 44 of the compact disc recorder 30, such as the second set 52 of push-buttons. Should the user program or direct the compact disc recorder 30 to write one or more digital files onto the compact disc, the central processing unit 94 would cause the one or more digital files in the data storage structure 106 to forward to the disc storage controller 96. As mentioned, the disc storage controller 96 amounts to an interface between the data storage or retrieval requests from the central processing unit 94 and the disc subsystem bus. As a result, the central processing unit 94 can direct the recording of the one or more digital files onto the compact disc by the compact disc recordable drive 58 (and/or the secondary compact disc recordable or DVD drive 108).

After writing to a compact disc, the recording can be played back by the compact disc recordable drive 58 or any standard compact disc player. During play back using the compact disc recorder 30, the digital graphic display unit 48 may display certain information relating to the play back. To play back the recording (or to play any other compact disc), the user merely employs the set 52 of push-buttons to direct the compact disc recorder 30 to enter a play compact disc mode and then presses the push-button 47 corresponding to "play" when the compact disc is inserted into the compact disc tray 54. This will be described more fully later herein. During play back, the compact disc recordable drive 58 converts the digital data on-board and outputs the analog signals for output through any of the outputs of the compact disc recorder 30 mentioned above, for example, through the line-out jack 78 and/or through the headphone jack 76. Additionally, the compact disc recorder 30 may be configured such that the compact disc recordable drive 58 can output signals for direct recording onto the data storage structure 106, thereby obviating the need to connect a signal source such as a compact disc player to any of the inputs of the compact disc recorder 30.

In the manner described above, the compact disc recorder 30 is primarily designed to provide that analog audio signals can be archived in a data storage structure 106, and later recalled to be recorded, or burned, onto a compact disc. The compact disc recorder 30 also provides that a user can review archived sound tracks by accessing the data storage structure 106 through software embedded within the central processing unit 94. This auditioning feature can be conducted on both a track-by-track basis and on an entire session basis. The benefit of being able to audition or review audio tracks before recording same onto a compact disc is that the recording quality, gain level and desired order of the sound tracks can be determined to be correct beforehand. Therefore, an ideal recording onto a compact disc can be achieved on the first try.

The compact discs produced by the compact disc recorder 30 are fully compatible with any present-day compact disc player. However, the compact disc recorder 30 can also be used to play back the compact disc after it is recorded thereon by the compact disc recordable drive 58 (or if the drive 58 is provided as being some other type of optical storage drive, preferably the optical storage medium recorded thereon can be played in that type of standard optical storage player). To this end, the compact disc recordable drive 56 (or a secondary compact disc recordable drive 108) itself can play back the compact disc. In addition, the compact disc recordable drive 56 can play standard commercially-produced audio compact disc (typically recorded in CD-DA audio format). As will be described more fully later herein, to have the compact disc recorder 30 play a compact disc, the user would again interact with specific controls on the front bezel 44 of the compact disc recorder 30, such as the first set 48 of push-buttons, as described previously herein. Should the user program or direct the compact disc recorder 30 to play a compact disc, analog signals would travel from the compact disc recordable drive 58 to outputs which are provided on the compact disc recorder 30, such as out the line-out jack 78 on the back panel 36 or the headphone jack 76 on the front bezel 44.

As mentioned, the back panel 36 of the compact disc recorder 30 includes a SCSI port 84. The SCSI port 84 provides that the compact disc recorder 30 can be used as a fully functional CD-R external drive for a multi-media personal computer (PC) system. To this end, a SCSI interface cable can be attached to the SCSI port 84 on the compact disc recorder 30 and to a SCSI card on the PC. This connection and the functionality of the compact disc recorder 30 enables a user to create backup copies of existing multi-media CD-ROMs, or programs or data stored on a hard drive. In addition, the user can compose and duplicate multi-media presentations using CD-R recordable blank media.

Preferably, the compact disc recorder 30 provides many enhanced features and functions, some of which have been mentioned hereinabove. Also, preferably the compact disc recorder 30 is easy to use. Some of these enhanced features (some of which have been already discussed hereinabove) and preferred screen displays of the display device 46 will now be described.

Some of the display device 46 outputs to be described contain song names, etc. which are presently commercially available and presumably protected by appropriate copyright laws. Of course, it is assumed that the user would have pre-acquired the legal right to do the acts to be described, or that the acts to be described are otherwise legal (e.g., fair use).

When the compact disc recorder 30 is initially turned on, the digital display 46 may, after a short time (after the central processing unit 94 initializes the internal components of the device 30, as already described), appear as shown in FIG. 1 displaying a start-up screen which may include a trademark.

Figure 7:
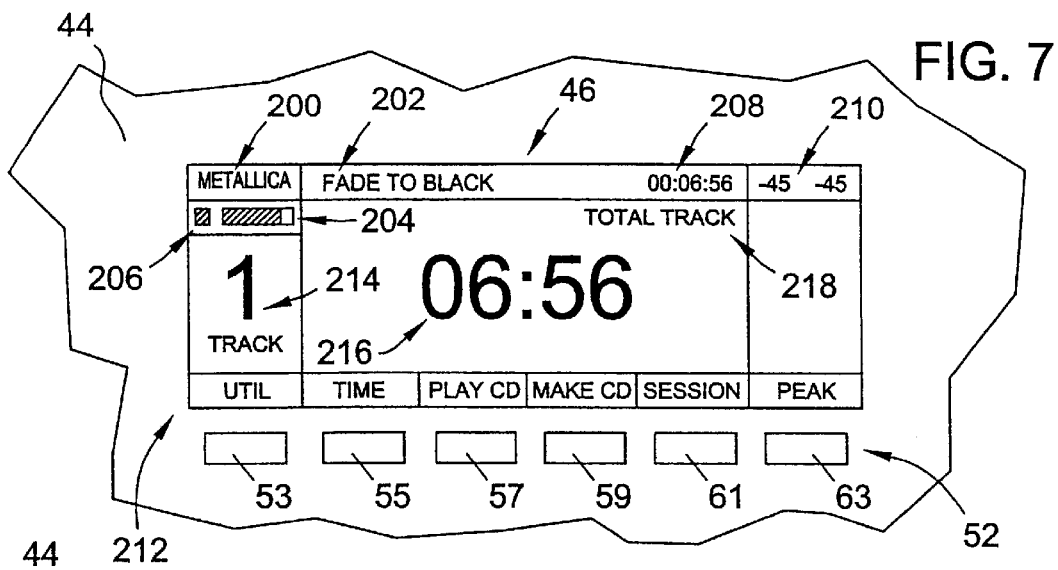
FIGS. 7–23 illustrate some of the different possible screen displays of the music jukebox illustrated in FIGS. 1 and 2.

Then, after another short time period, the digital display 46 may appear as illustrated in FIGS. 2 and 7. FIGS. 7–23 are cut-aways of the front bezel 44, including the set 52 of push-buttons 53, 55, 57, 59, 61, 63 adjacent the display device 46. When describing each of these displays, like reference numerals will be used to identify like items and, at times, detailed discussion thereof will be omitted.

Attention is specifically directed to FIG. 7. As shown, the display device 46 may initially display session name indicia 200, song name indicia 202, time indicia 208 which indicates the length of the song in terms of time, peak level indicator indicia 210, track number indicia 214 which indicates the position of that particular song within the session, status indicia 206 which indicates what the compact disc recorder 30 is doing, session time remaining indicia 204, display indicia 218 which indicates what it is that a center display 216 is indicating, and selection menu 212 which indicates functions a user can access by pressing a corresponding push-button 53, 55, 57, 59, 61, 63 from the set 52 of push-buttons adjacent the display device 46 on the front bezel 44.

Essentially, the screen display shown in FIG. 7 is indicating that the session is called "Metallica", the song track entitled "Fade to Black" is the first song in the session, the total track time is being displayed and the song is 6:56 long, there is about 20% remaining in the session (the entire session will fit on a compact disc and some more sound tracks can still be added), the compact disc recorder 30 is in a stop mode, the inputs to the compact disc recorder 30 are low (−45 right channel and −45 left channel), and the user may use the corresponding push-button 53, 55, 57, 59, 61, 63 to select one of the following functions: utility, time, play a compact disc, make a compact disc, session and peak.

Specifically, pressing push-button 55 (time function) will change the center display to indicate, for example, the time elapsed in the song during play back from the data storage structure, the amount of time used in the session, the amount of time remaining in the session, etc. depending on how many times the push-button 55 is pressed. As the center display changes, the display indicia 218 changes to indicate what it is that the center display 216 is indicating.

Figure 23:
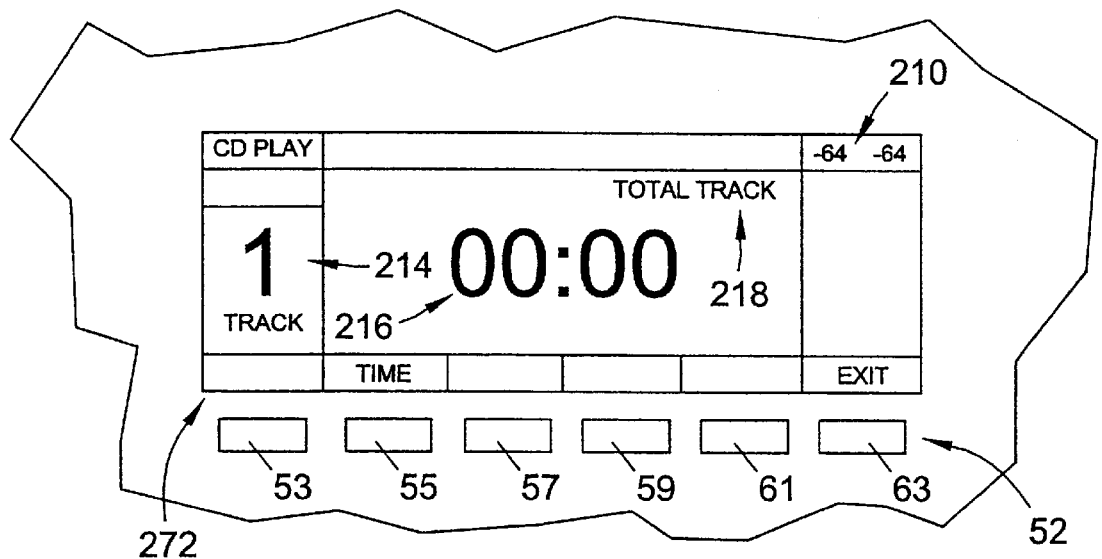

Pressing push-button 57 causes the compact disc recorder 30 to enter a play CD mode wherein a compact disc placed in the compact disc tray 54 can be played back using the compact disc recordable drive 58. During play CD mode, the set 48 of push-buttons on the front bezel 44 may be operated much like the controls of a standard compact disc player. When the compact disc recorder 30 enters this mode, the display device 46 may appear as shown in FIG. 23 indicating that track one of the compact disc received is 00:00 long (essentially indicating that no compact disc has been inserted in the compact disc tray 54). At this time, the selection menu 272 includes two options: time and exit. Pressing the push-button 55 (corresponding to the time option) causes the center display 216 to indicate, for example, the time elapsed in the song, the amount of time remaining in the song, the amount of time elapsed on the disc and the amount of time remaining on the disc, etc. depending on how many times the push-button 55 is pressed. As the center display changes, the display indicia 218 changes to indicate what it is that the center display 216 is indicating. Pressing push-button 63 (corresponding to the exit option) causes the compact disc recorder 30 to exit the play back mode and revert back to the display illustrated in FIG. 7.

When the display device 46 appears as illustrated in FIG. 7, pressing push-button 59 causes the compact disc recorder 30 to enter a write compact disc mode at which time the display device 46 may prompt (such as by pressing push-button 47) the user to confirm that a compact disc is to be made. After the user confirms as such, the compact disc recorder 30, and specifically the compact disc recordable drive 58 component thereof, begins writing the session to a compact disc inserted in the tray 54. As will be described, a session will typically be a group of sound tracks which have been previously assigned to that particular session.

Figure 8:
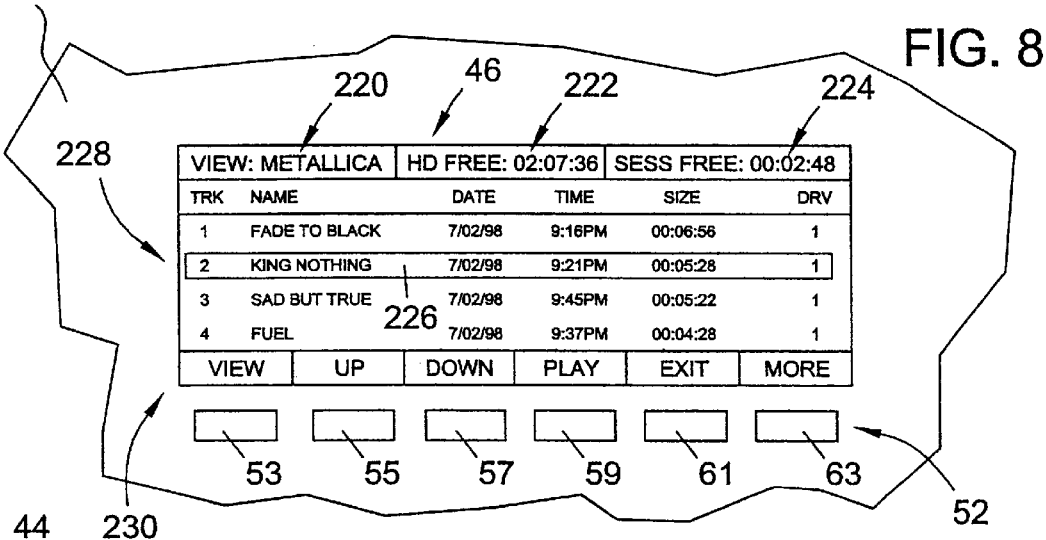

To view the contents of a particular session, one presses the push-button 61 when the display device 46 appears as illustrated in FIG. 7, at which time the display changes to that which is shown in FIG. 8. The display includes session title indicia 220, data storage structure free space indicia 222, session remaining time indicia 224, a session song list 228 which is a list of all the sound tracks assigned to that particular session, a cursor 226 which can be maneuvered among the session song list 228, and a selection menu 230 which indicates the functions a user can access by pressing a corresponding push-button 53, 55, 57, 59, 61, 63 from the set 52 of push-buttons adjacent the display device 46 on the front panel: view, up, down, play, exit, more.

Essentially, the screen display depicted in FIG. 8 is indicating that the session is called "Metallica", the session includes at least sound tracks which have been entitled (by the user) "Fade to Black", "King Nothing", "Sad But True" and "Fuel".

Figure 19:
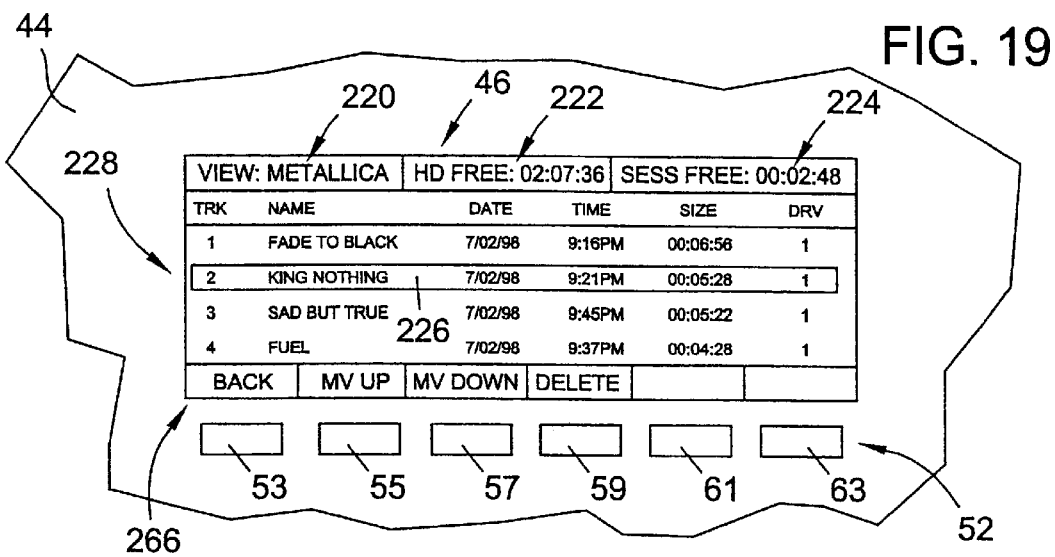

Pressing push-button 55 causes the cursor 226 to move up the session song list 228, and pressing push-button 57 causes the cursor 226 to move down the session song list 228 thereby possibly causing the session song list 228 to scroll down and display sound tracks beyond the first four. Pressing and holding down push-button 59 causes the compact disc recorder 30 to begin playing the track highlighted by the cursor 226 until the push-button 59 is released (used primarily only to identify which sound track is highlighted—to truly listen to tracks within a session, a user would press push-button 61 and revert back to the screen display shown on FIG. 7, then the user would interact with the other set 48 of push-buttons much like operating a standard compact disc player). Pressing push-button 61 causes the screen display to revert back to that which is shown in FIG. 7. Pressing push-button 63 when the screen display is as shown in FIG. 8 causes the screen display to appear as shown in FIG. 19. As shown, the only difference between the two displays (FIG. 8 and FIG. 19) is that the selection menu (266 in FIG. 19) has changed to indicate that the following functions are accessible: back, move up, move down, delete. Pressing push-button 53 causes the screen display to revert back to 4o the display shown in FIG. 8. In contrast, pressing push-button 55 causes the highlighted sound track in the session song list 228 to move up within the list (as shown "King Nothing" would be moved ahead of "Fade to Black" to occupy the first spot in the list), and pressing push-button 57 causes the highlighted sound track in the session song list 228 to move down within the list (as shown "King Nothing" would be moved behind "Sad But True" to occupy the third spot in the list). Pressing push-button 59 causes the highlighted sound track in the session song list 228 to be deleted from that particular session. However, this does not cause the sound track to be deleted from the data storage device on which the sound track has been stored, and the sound track will still remain contained in the master song list which is accessed by pressing push-button 53 while the display is as shown in FIG. 8, after which the display device 46 appears as shown in FIG. 9.

Figure 9:
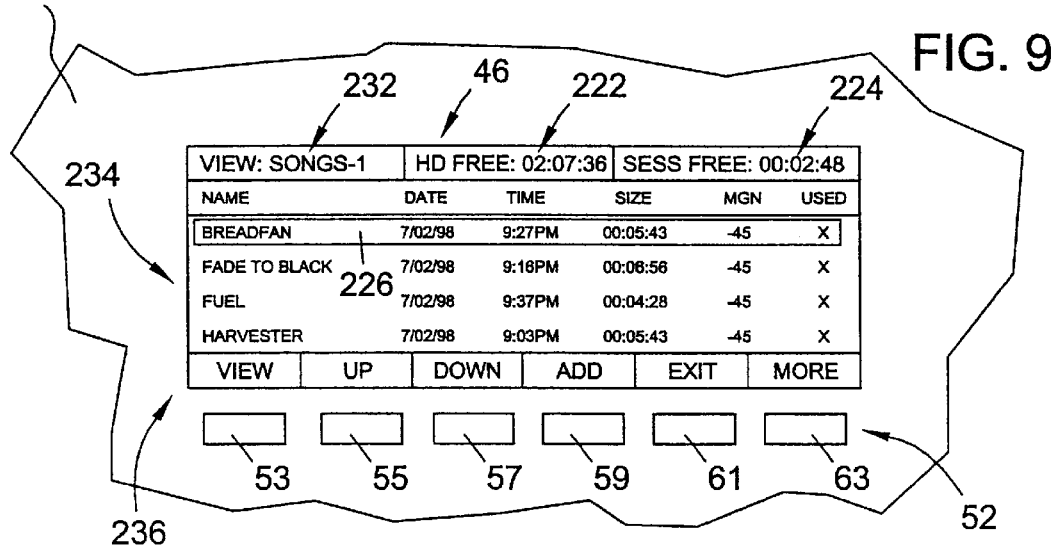

The display shown in FIG. 9 includes data storage structure indicia 232 which indicates in which data storage structure (e.g. part 106) the list of sound tracks is stored, a master sound track list 234 which lists all the sound tracks stored in the data storage structure indicated by the data storage structure indicia 232, and selection menu 236 which indicates that a user can access the following functions by pressing a corresponding push-button 53, 55, 57, 59, 61, 63 from the set 52 of push-buttons on the front bezel 44: view, up, down, add, exit, more.

Essentially, the screen display shown in FIG. 9 is indicating that the data storage structure indicated by the data storage structure indicia 232 includes at least sound tracks which have been entitled (by the user) "Breadfan", "Fade to Black", "Fuel" and "Harvester" and that each of the sound tracks are used within at least one session (as indicated by the x's).

Figure 16:
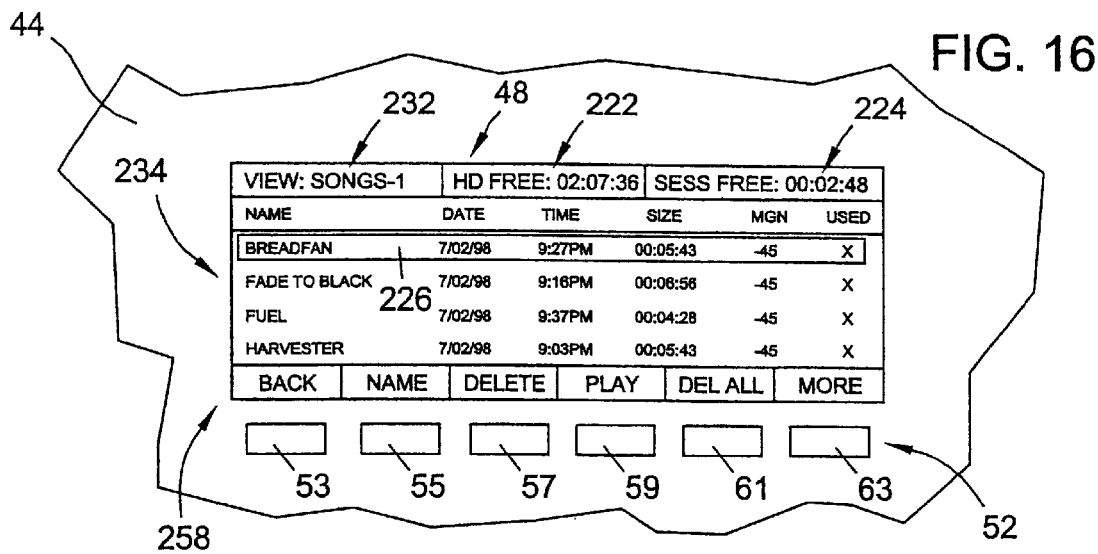
Figure 18:
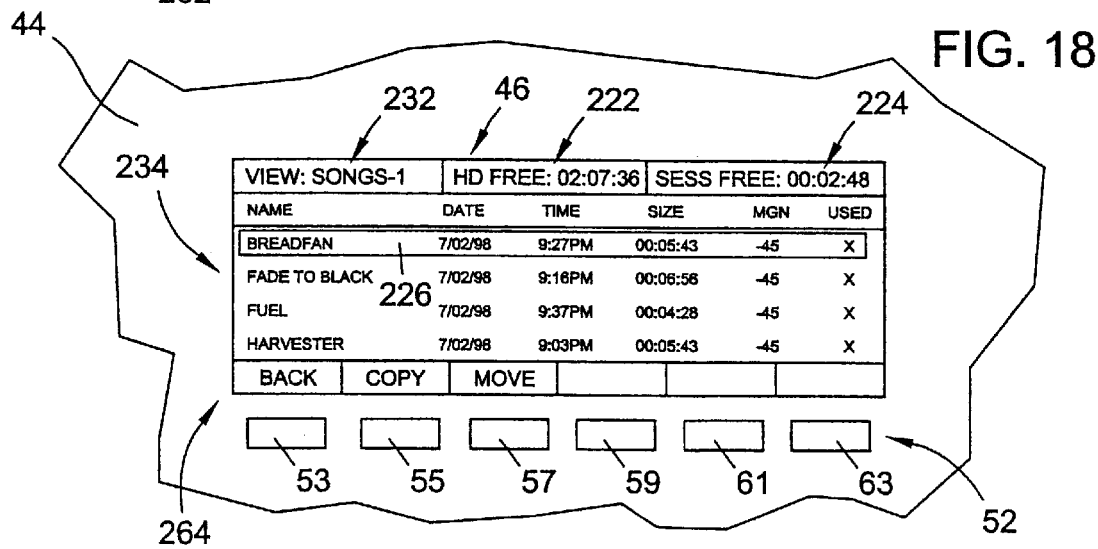

Pressing push-button 55 causes the cursor 226 to move up the master sound track list 234, and pressing push-button 57 causes the cursor 226 to move down the master sound track list 234 thereby possibly causing the master sound track list 234 to scroll down and display sound tracks beyond the first four. Pressing push-button 59 causes the sound track highlighted by the cursor 226 to be added to the session which has been selected (session selection will be described in connection with FIG. 10). Pressing push-button 61 causes the display to revert back to that which is shown in FIG. 7. Pressing push-button 63 causes the screen display to appear as shown in FIG. 16. As shown, the only difference between the two displays (FIG. 9 and FIG. 16) is that the selection menu (258 in FIG. 16) has changed to indicate the following functions are accessible: back, name, delete, play, delete all, more. Pressing push-button 53 causes the screen display to revert back to the display shown in FIG. 9. Pressing push-button 55 allows the user to name (or re-name) the highlighted sound track. Pressing push-button 57 causes the sound track highlighted by the cursor 226 to be deleted from the data storage structure indicated by the data storage structure indicia 232. Pressing and holding down push-button 59 causes the compact disc recorder 30 to begin playing the track highlighted by the cursor 226 until the push-button 59 is released (used primarily only to identify which sound track is highlighted—to truly listen to tracks within a session, a user would press push-button 61 when the screen appears as shown in FIG. 9 to cause the screen to appear as shown in FIG. 7, then the user would interact with the other set 48 of push-buttons much like operating a standard compact disc player). Pressing push-button 61 when the screen appears as shown in FIG. 16 causes any sound tracks which are not assigned to a session (indicated as not having an "x" in the used column) to be erased or otherwise made unavailable. Preferably, pressing push-button 57 or 61 causes the compact disc recorder to prompt the user for a confirmation (such as by having the user press push-button 47) that a deletion is actually desired. Additionally, the user may be prompted for a password before the one or more sound tracks are deleted. Upon deleting a sound track, the sound track would no longer appear in the master list 234. Pressing push-button 63 causes the screen display to appear as shown in FIG. 18. As shown, the only difference between the two displays (FIG. 16 and FIG. 18) is that the selection menu (264 in FIG. 18) has changed to indicate that the following selections are possible: back, copy, move. Pressing push-button 55 allows the user to copy the highlighted sound track to another data storage structure, and pressing push-button 57 allows a user to move the highlighted sound track to another data storage structure. Pressing push-button 53 causes the screen display to revert back to that which is shown in FIG. 16.

Figure 17:
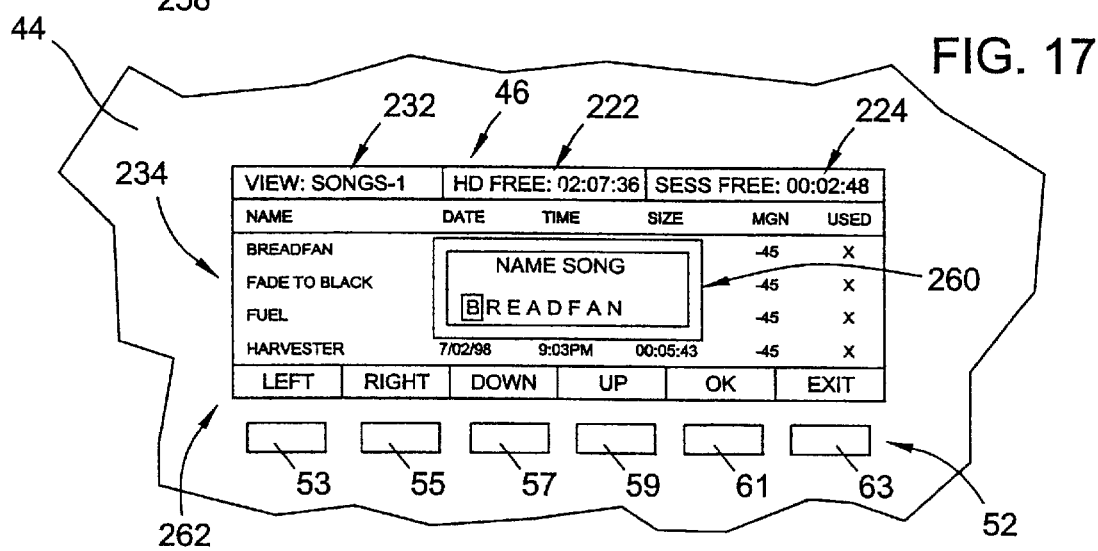

As mentioned, pressing push-button 55 when the display is as shown in FIG. 16 allows a user to name (or re-name) the sound track which is highlighted by the cursor 226. After the push-button 55 is pressed, the display device 46 may appear as shown in FIG. 17 where a naming box 260 appears substantially at the center of the display. Pressing push-button 53 causes the cursor in the song title to move to the left, pressing push-button 55 causes the cursor in the song title to move to the right, pressing push-button 57 causes the letter highlighted by the cursor to move down (i.e. from "b" to "a") and pressing push-button 59 causes the letter highlighted by the cursor to move up (i.e. from "b" to "c"). Then, pressing push-button 61 causes the display to revert back to FIG. 16 after saving the sound track title just entered using push-buttons 53, 55, 57 and 59, and pressing push-button 63 causes the display to revert back to FIG. 16 without saving the sound track title just entered using push-buttons 53, 55, 57 and 59 (i.e. the former title is retained). Of course, instead of providing this means to enter a song title, a four-way or other type of menu may be provided for selecting letters and other characters. Alternatively, as mentioned, a microphone 75 (or a microphone jack for receiving a microphone) may be provided on the compact disc recorder 30 thereby allowing the user to input song names by voice. This is depicted in FIGS. 1, 2 and 5a. In fact, the compact disc recorder 30 can be configured such that a user can also maneuver through the several menus using one's voice.

Figure 10:
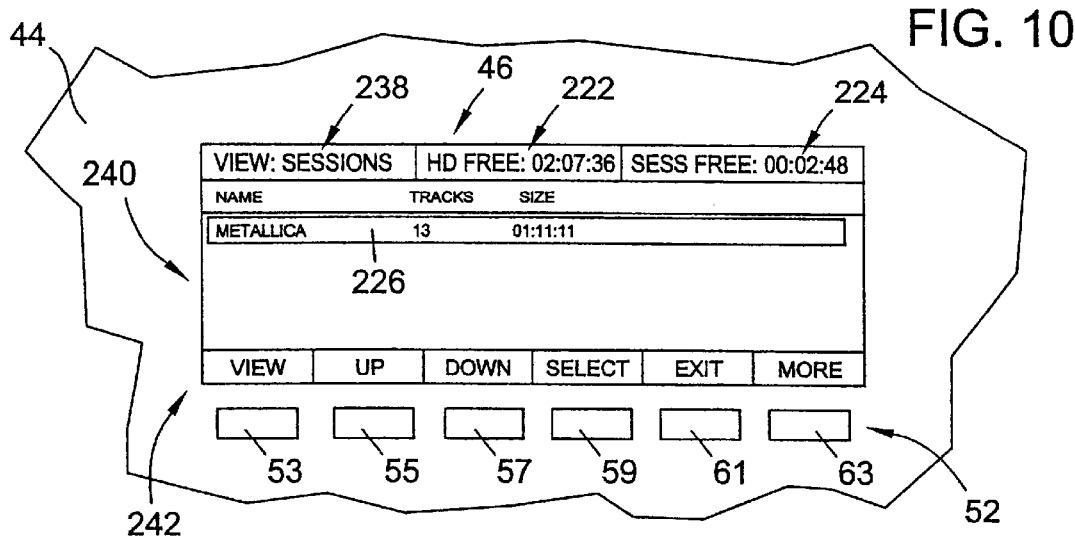
Figure 20:
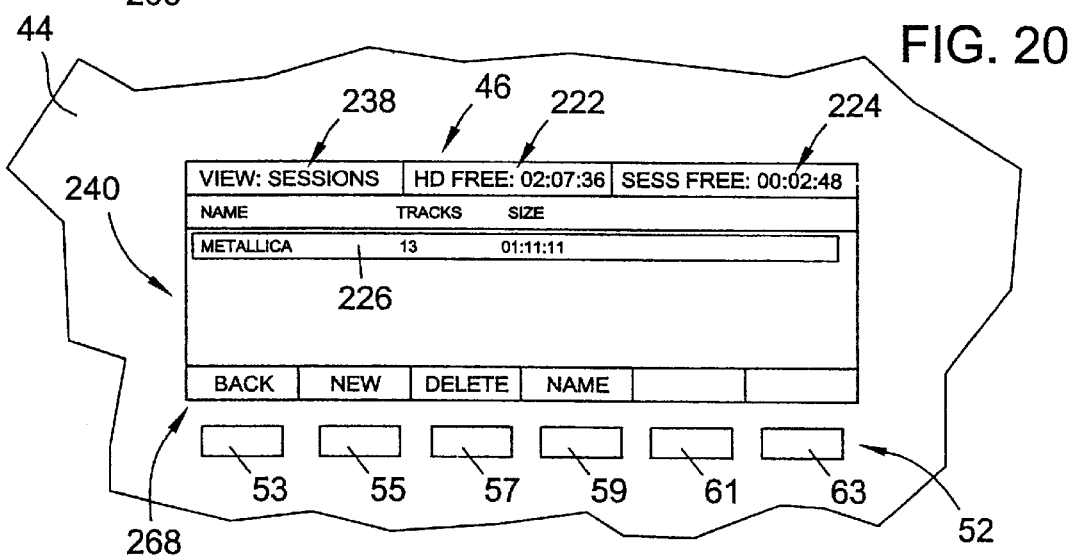

After the display has reverted back to that which is shown in FIG. 16, push-button 53 can be pressed to have the display revert back to that which is shown in FIG. 9. If push-button 53 is then pressed (the "view" function), the display appears as shown in FIG. 10 where the display contains a session list 240. Selection menu 242 indicates that pressing push-button 55 causes the cursor 226 to move up within the list of sessions, and pressing push-button 57 causes the cursor 226 to move down within the list of sessions. Pressing push-button 59 results in the session highlighted by the cursor 226 being selected. As a result, any sound tracks recorded into the compact disc recorder 30 (recording will be described more fully later herein) will be assigned to the end of that particular session. Pressing push-button 61 causes the display to revert back to that which is shown in FIG. 7 at which time recording a sound track into that session can be performed. Pressing push-button 63 when the display is as shown in FIG. 10 causes the display to appear as shown in FIG. 20 at which time the selection menu 266 indicates that pressing push-button 57 provides that the session highlighted by the cursor 226 becomes deleted (the sound tracks contained therein would still remain in the master sound track list 234 depicted in FIGS. 9 and 16–18), pressing push-button 59 allows the user to name (or re-name) the session highlighted by the cursor 226 in much the same manner as a song is named (or re-named) (see FIG. 17 and the description hereinabove associated therewith), pressing push-button 55 provides that a new session is added to the session list (the new session may first be given a generic name by the compact disc recorder 30 such as "session33", but the session can be re-named as mentioned above) and pressing push-button 53 when the display is as shown in FIG. 20 provides that the display reverts back to that which is shown in FIG. 10.

Figure 11:
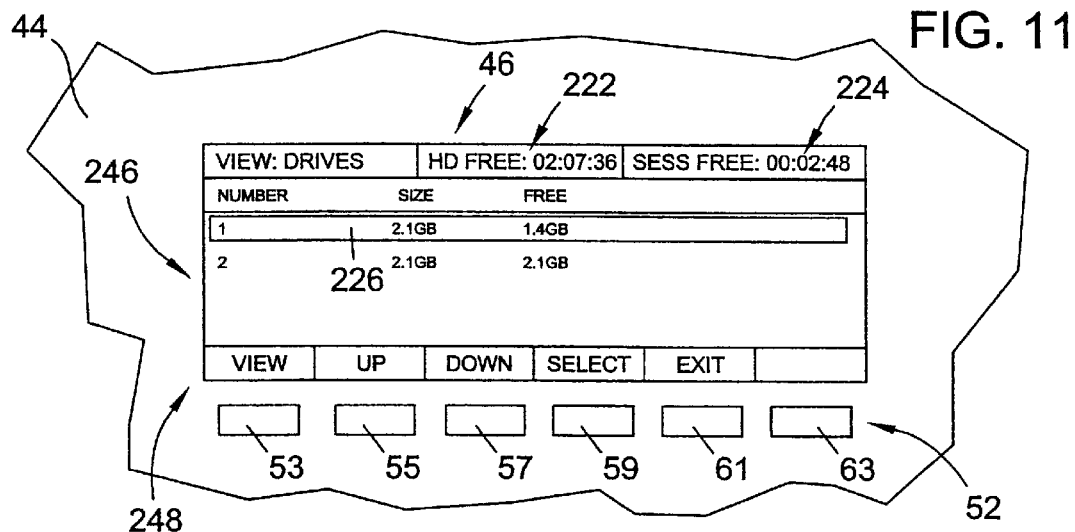

Pressing push-button 53 at such time provides that the display appears as shown in FIG. 11, where a data storage structure list 246 is displayed and a selection menu 248 indicates that pressing push-button 55 causes the cursor to move up within the list 246, pressing push-button 57 causes the cursor to move down within the list 246, pressing push-button 59 causes the highlighted data storage structure to be selected, pressing push-button 61 causes the display to revert back to that which is shown in FIG. 7, and pressing push-button 53 causes the display to again display a session song list 228 as shown in FIG. 8.

Figure 21:
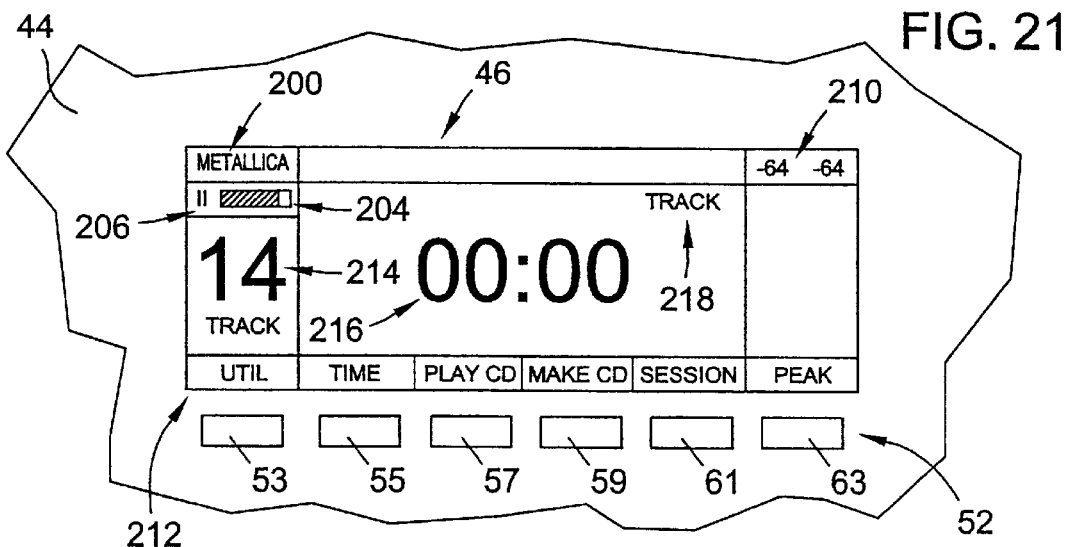

When the display is as shown in FIG. 7, a sound track may be recorded into the selected data storage structure (i.e. 106), as described above in connection with FIG. 11. To begin recording, a user merely presses key 50 (the "record" key) on the front bezel 44. This causes the display to appear as shown in FIG. 21. At such a time, the compact disc recorder 30 is not initially recording any sounds received through the analog line in jack 70 (or any of the other inputs provided on the device 30), but is "listening" to the sounds. Thus, a user may start sending sounds into the analog line in jack 70 or any other analog lines in provided (such as by pressing play on the standard compact disc player or cassette tape player connected thereto) and may preview and set the recording level. The recording level will appear in the right-hand part of the display as two vertical bars—one corresponding to the left channel, and the other corresponding to the right channel. Also, two numbers (both-64 as shown in FIG. 21) over the vertical bars will indicate the amount of headroom the maximum signal has before the digital signal to be created by the recording is clipped. A user may want to get these two numbers to a specific value (often depending on the type of music recorded) as the compact disc recorder 30 previews the highs in the sound track. To adjust the recording volume, a user manipulates the adjusters 60 (left 62 and right 64).

Figure 22:
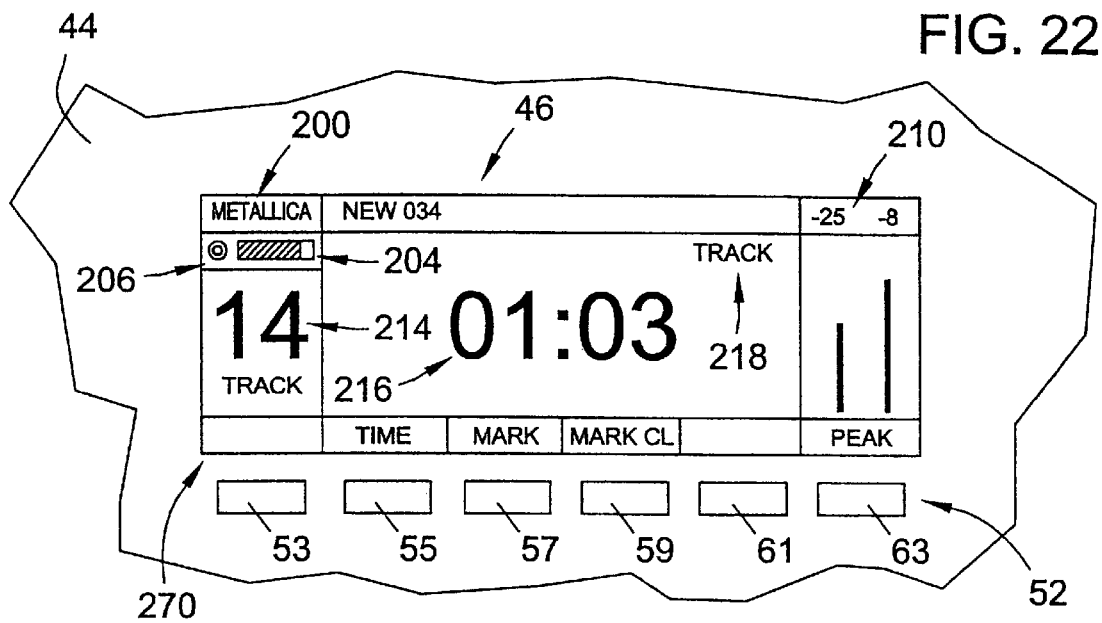

When a user then presses the push-button 47 on the front bezel 44, the compact disc recorder 30 begins recording the sound track into the session previously selected, and onto the data storage structure previously selected. As shown in FIG. 22, during the recording, the display indicates the time elapsed in the recording (1:03), the position of the sound track within the session (track 14) and the name of the session into which the sound track is being recorded (a session called "Metallica"). Additionally, the display indicates the status of the compact disc recorder 30 (recording) using the status indicator 206 and indicates the time left within the session, which will ultimately depend on how much music can be stored on a compact disc. Furthermore, the display indicates the recording volume in the form of the already-mentioned two vertical bars and associated numbers, and indicates that the sound track has been assigned the generic name "New034" (of course, the sound track name can be changed as described above). During recording, the selection menu 270 indicates that a user may press push-button 55 to change the center display 216 to indicate, for example, total session time elapsed, total session time remaining, track time remaining, etc. and what the center display 216 is indicating will be identified by display indicia 218. Pressing push-button 63 causes the peak level bars and associated numbers to reset. Pressing push-button 57 leaves a "mark" in the sound track at that particular location in the song, and pressing push-button 59 causes the mark to be cleared. When a user decides that recording is finished, the user presses push-button 50 on the front bezel 44 to immediately begin recording the next track, or presses push-button 41 to stop recording. Once recording is stopped, the display reverts back to that which is described in FIG. 7 at which time a user may edit any of the sound tracks in that particular session. Leaving one or more marks within the sound tracks allows one to edit the sound tracks once they have been recorded into the selected data storage structure.

Figure 12:
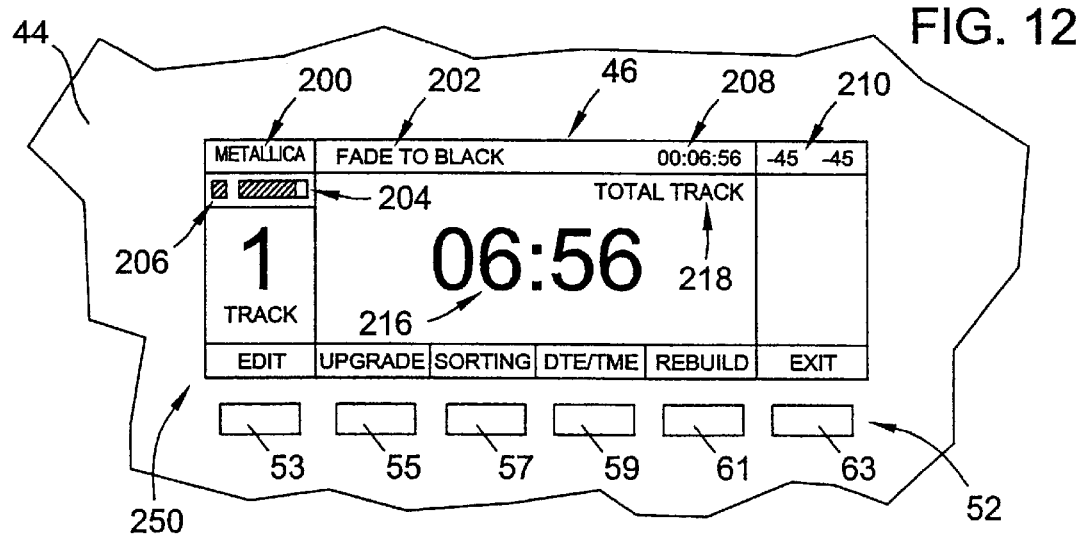
Figure 13:
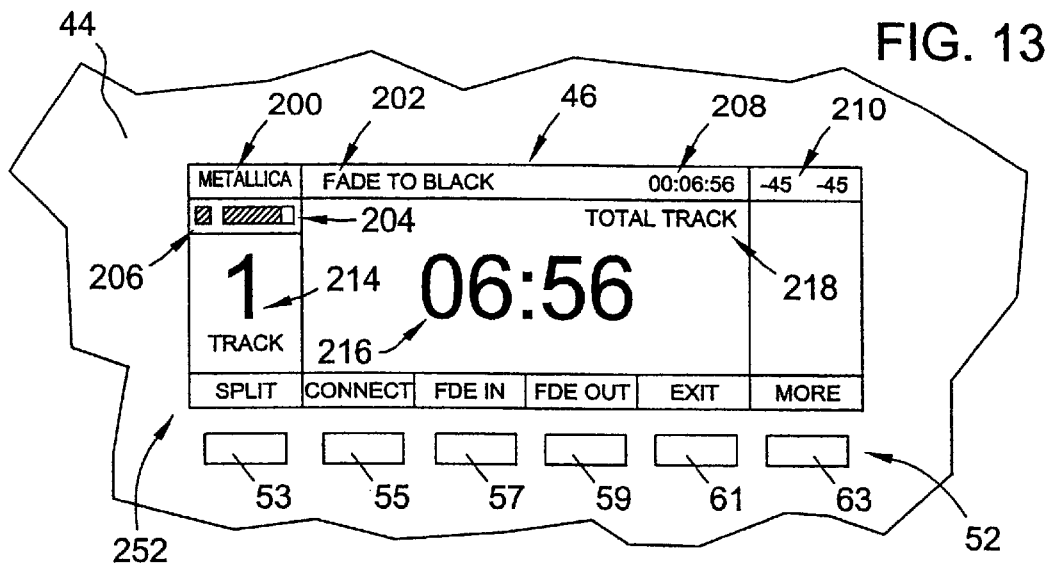
Figure 14:
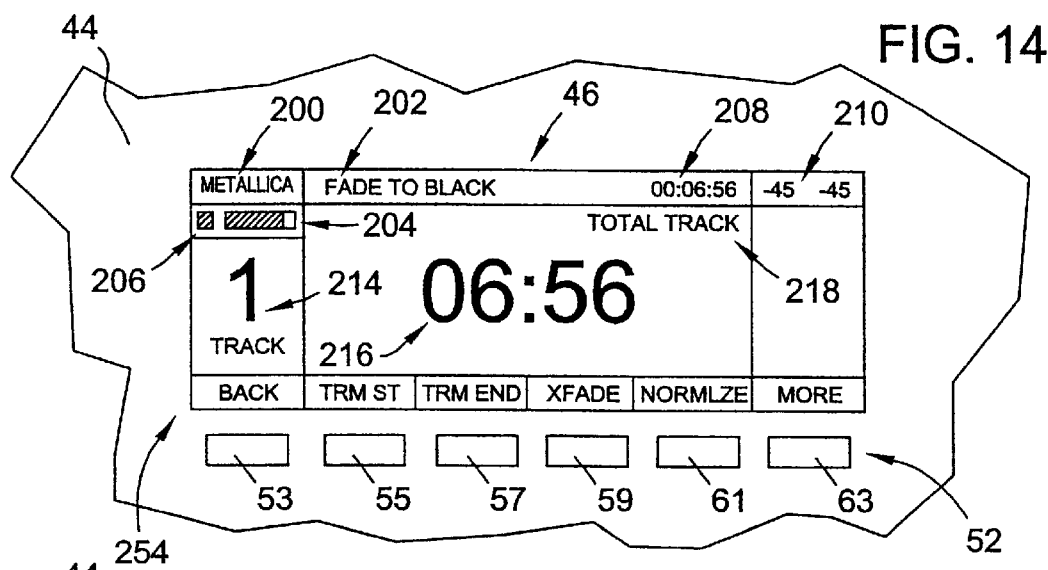

Editing sound tracks contained within a session will now be described. To edit a particular sound track in a session, one selects the sound track by using the push-buttons 45 and 49 when the display device 46 appears as shown in FIG. 7. Once the desired sound track is displayed, push-button 53 is pressed, and the display appears as shown in FIG. 12 at which time pressing push-button 63 causes the display to revert back to that which is displayed in FIG. 7. In contrast, pressing push-button 53 when the display appears as shown in FIG. 12 causes the display to appear as shown in FIG. 13 at which time selection menu 252 indicates that pressing push-button 55 causes the compact disc recorder 30 to connect a plurality of sound tracks together into a single sound track, pressing push-button 57 causes the compact disc recorder 30 to re-configure the sound track so that it fades in to the first mark placed in the sound track, pressing push-button 59 causes the compact disc recorder 30 to re-configure the sound track so that it fades out from the last mark placed in the sound track, pressing push-button 61 causes the display to revert back to that which is displayed in FIG. 12, and pressing push-button 63 causes the display to provide a selection menu 254 as shown in FIG. 14 at which time it is indicated that pressing push-button 55 causes the compact disc recorder 30 to trim the beginning of a sound track up to the first mark placed in the sound track, pressing push-button 57 causes the compact disc recorder 30 to trim the end of a sound track from the last mark placed in the sound track, pressing push-button 59 causes the compact disc recorder 30 to re-configure the sound track so that it fades out from the last mark placed in a sound track and fades in to the first mark placed in the next sound track in the session, and pressing push-button 61 causes the display to adjust the amplitude of the soundtrack to a selected value whereafter preferably the user is prompted to input a value corresponding to the amplitude desired.

Figure 15:
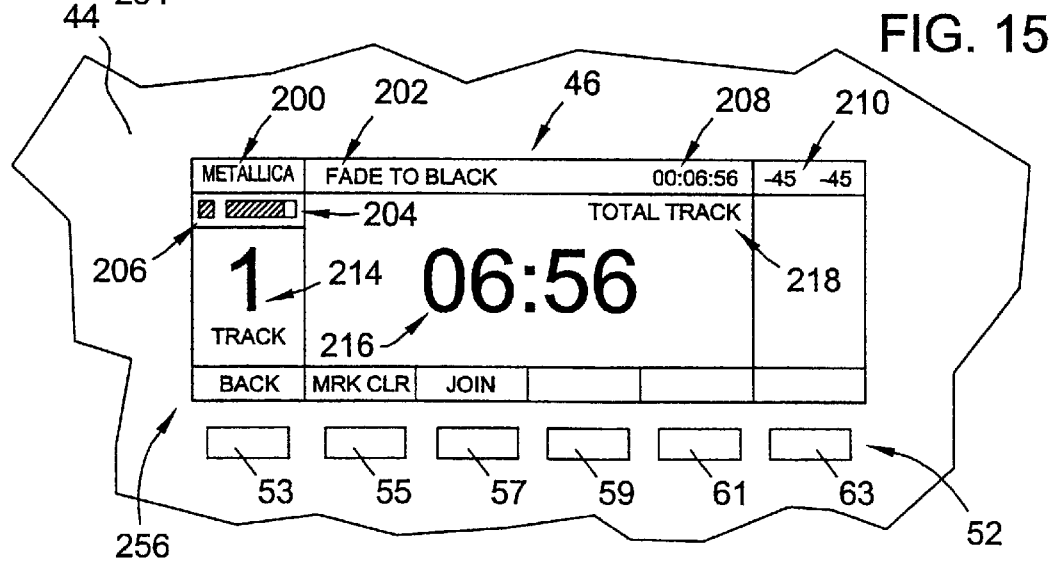

Pressing push-button 63 causes the display to provide a selection menu 256 as shown in FIG. 15 indicating that pressing push-button 55 will cause any marks placed within the sound track to be cleared and pressing push-button 57 will cause two sound tracks to be joined. Pressing push-button 53 causes the display to revert back to that which is shown in FIG. 14, and pressing push-button 53 again causes the display to revert back to that which is shown in FIG. 13 at which time pressing push-button 61 causes the display to revert back to the display shown in FIG. 7.

From FIG. 7, pressing push-button 53 causes the display to revert back to the display shown in FIG. 12. Thereafter, pressing push-button 55 causes the compact disc recorder 30 to search for and utilize an upgrade compact disc in the compact disc tray 54. Hence, as mentioned, upgrades in the software can be performed using an upgrade compact disc. Pressing push-button 57 causes the display 46 to prompt the user as to how the sound tracks should be sorted in the master song list 234 such as by name, size or time and date recorded. Pressing push-button 59 allows the user to set the date and time in the device 30. Pressing push-button 61 causes the compact disc recorder 30 to rebuild certain session information files. As mentioned, pressing push-button 63 causes the display to revert back to that which is shown in FIG. 7.

Of course, the screen displays as illustrated on FIGS. 7–23 are merely illustrative, and may take many forms without departing from the scope of the present invention. Additionally, there may, in fact, be no input keys provided on the device 30 and all commands can be given by voice via the microphone 75, if provided.

The compact disc recorder 30 in accordance with an embodiment of the present invention provides several advantages which include, but are not limited to, being as easy to use in many respects as a modem-day audio tape recorder/player or compact disc player. Additionally, the compact disc recorder 30 in accordance with the present invention also provides that one can listen to a sound track before the sound track is to be recorded. In other words, one can truly audition a recording. Moreover, the compact disc recorder 30 can be used like a modern day juke box where songs are played directly from memory without needing to insert the compact disc containing the music. Additionally, the compact disc recorder 30 preferably provides enhanced features for editing the sound tracks recorded into the memory of the compact disc recorder 30. Using the compact disc recorder 30, one can easily customize the order in which sound tracks will appear on the compact disc and one can easily write several compact discs having different orders of songs or having slightly different compilations without having to re-enter the sounds into the device 30. Finally, unlike present-day compact disc players, the compact disc recorder 30 preferably doubles as a SCSI device for use with a PC.

While a preferred embodiment of the present invention is shown and described, it is envisioned that those skilled in the art may devise various modifications and equivalents without departing from the spirit and scope of the invention as defined by the appended claims.

What is claimed is:

1. A music jukebox configured for storing a music library therein, said music jukebox comprising: a housing; an audio data receiver arranged to receive audio data from outside the housing; audio output structure located at least partially within the housing for outputting audio signals; data storage memory in the housing for storing audio data received from outside the housing through the audio data receiver, said music jukebox including a user interface comprising a display device located at least partially within the housing, said display device providing a display which is viewable from outside the housing, and a plurality of manually operable function controllers on the housing, said music jukebox configured such that a music library of sound tracks is storable in digital form in the data storage memory as a result of audio data being received from outside the housing through the audio data receiver, said music jukebox configured such that said music library is organizable into a master song list and at least one group of sound tracks wherein each group comprises at least one sound track selected from the master song list, wherein said music jukebox is configured such that indicia of said master song list and indicia of at least one group of sound tracks are displayable on said display, wherein said music jukebox is configured such that said plurality of manually operable function controllers is useable to select a group of sound tracks stored in the data storage memory and operate the music jukebox such that said music jukebox outputs audio signals through said audio output structure.

2. A music jukobox as recited in claim 1, further comprising a device located at least partially within the housing for receiving a compact disc ("CD"), said music jukebox configured to selectively operate as a CD player whereby sound tracks stored on the CD are playable through the audio output structure.

3. A music jukebox as recited in claim 1, wherein said music jukebox is configured such that the at least one sound track stored in the data storage memory is editable before being played through the audio output structure.

4. A music jukebox as recited in claim 2, said music jukebox configured such that sound tracks which are stored in the data storage memory are selectively playable through the audio output structure without the sound tracks having to be contained on the CD.

5. A music jukebox as recited in claim 3, further comprising at least one manually operable function controller capable of being operated to facilitate editing.

6. A music jukebox as recited in claim 1, said music jukebox configured such that at least one sound track in the data storage memory is organizable into at least one group of sound tracks.

7. A music jukebox as recited in claim 1, further comprising at least one manually operable function controller capable of being operated to facilitate organizing at least one sound track into at least one group of sound tracks.

8. A music jukebox as recited in claim 1, said music jukebox configured to display a peak level indicator.

9. A music jukebox as recited in claim 1, said music jukebox configured such that names are assignable to at least one sound track in the data storage memory.

10. A music jukebox as recited in claim 1, further comprising at least one manually operable function controller capable of being operated to facilitate assigning names to at least one sound track in the data storage memory.

11. A music jukebox as recited in claim 6, said music jukebox configured such that names are assignable to at least one group of sound tracks.

12. A music jukebox as recited in claim 11, further comprising at least one manually operable function controller capable of being operated to facilitate naming at least one group of sound tracks.

13. A music jukebox as recited in claim 1, wherein said data storage memory comprises a hard drive.

14. A music jukebox as recited in claim 1, wherein said audio data receiver comprises at least one line in jack.

15. A music jukebox as recited in claim 1, wherein said audio output structure comprises at least one line out jack.

16. A music jukebox as recited in claim 1, further comprising at least one manually operable function controller capable of being operated to facilitate digitally editing at least one sound track in the data storage memory.

17. A music jukebox as recited in claim 16, wherein said plurality of manually operable function controllers comprises buttons.

18. A music jukebox as recited in claim 1, further comprising means for setting an input gain of the audio data received through the audio data receiver.

19. A music jukebox as recited in claim 18, wherein the means for setting the input gain comprises at least one manually operable function controller.

20. A music jukebox as recited in claim 18, wherein the means for setting the input gain comprises a first manually operable function controller for adjusting the input gain of a right channel and a second manually operable function controller for adjusting the input gain of a left channel.

21. A music jukebox as recited in claim 1, further comprising a signal receiver arranged to receive signals from a wireless remote control.

22. A music jukebox as recited in claim 1, wherein said audio data receiver comprises at least one external digital interface.

23. A music jukebox as recited in claim 1, wherein the music jukebox is configured to close a sound track being recorded and begin recording another sound track each time a single manually operable function controller is operated.

24. A music jukebox as recited in claim 22, wherein said external digital interface is communicatingly connected to at least one of a Serial Interface Bus and a Digital Signal Processor.

25. A music jukebox as recited in claim 24, wherein said external digital interface comprises an interface that is compatible with an SPDIF signal.

26. A music jukebox as recited in claim 3, wherein the music jukebox is configured to perform editing functions including at least one of splitting, joining, fading in, fading out, normalizing, cross fading, and conecting at least one sound track in the data storage memory.

27. A music jukebox as recited in claim 1, wherein the music jukebox is configured to rebuild a file in said data storage memory.

28. A music jukebox as recited in claim 2, wherein the music jukebox is configured to utilize an upgrade CD which is configured to facilitate installation in said music jukebox of an upgrade of an operating system.

29. A music jukebox as recited in claim 1, wherein the music jukebox is configured to sort at least one of the sound tracks and the groups of sound tracks stored in said data storage memory according to indicia of said sound tracks and groups of sound tracks.

30. A music jukebox as recited in claim 1, wherein the music jukebox is configured to audition at least one sound track in said data storage memory.

31. A music jukebox as recited in claim 2, wherein said music jukebox is configured to read audio data on a compact disc and is configured to store the audio data as sound tracks in the data storage memory of the music jukebox.

32. A music jukebox as recited in claim 31, wherein the music jukebox is configured to add at least one sound track read from the compact disc into the master song list.

33. A music jukebox as recited in claim 31, wherein said music jukebox is configured to add at least one sound track read from the compact disc into a group of sound tracks in the data storage memory.

34. A music jukebox as recited in claim 33, wherein said music jukebox is configured to add all sound tracks which are on the compact disc into a group of sound tracks in the data storage memory.

35. A music jukebox as recited in claim 1, wherein the display comprises a touch screen such that the music jukebox is capable of being operated by touching the touch screen display using at least one of a finger, a light pen and a stylus.

36. A music jukebox as recited in claim 1, wherein the user interface further comprises a microphone and sound receiving means located at least partially within the housing.

37. A music jukebox as recited in claim 36, wherein the music jukebox is configured such that the music jukebox is capable of being operated by a user using voice commands.

38. A music jukebox as recited in claim 1, further comprising a device located at least partially within the housing for receiving an audio Digital Versatile Disc (DVD), said music jukebox configured to selectively operate as an audio DVD player whereby sound tracks stored on the audio DVD are playable through the audio output structure.

39. A music jukebox as recited in claim 38, wherein the music jukebox is configured to read audio data on the audio DVD and is configured to store the audio data as sound tracks in the data storage memory of the music jukebox.

40. A music jukebox as recited in claim 36, wherein the music jukebox is configured to receive a voice message that is input through the microphone, and store said voice message in digital form on the data storage memory in a file linked to the current sound track selected.

41. A music jukebox as recited in claim 1, wherein the audio data receiver comprises at least one of a balanced jack and an unbalanced jack.

42. A music jukebox as recited in claim 1, wherein the audio output structure includes at least one of a balanced jack and an unbalanced jack.

43. A music jukebox as recited in claim 1, further comprising an amplifier located in the housing.

44. A music jukebox as recited in claim 18, wherein the music jukebox is configured to automatically set the input gain.

45. A music jukebox as recited in claim 1, wherein the audio output structure comprises at least one of a headphone jack and a phone jack.

46. A music jukebox as recited in claim 1, further comprising at least one manually operable function controller, configured such that said manually operable function controller is operable to adjust an output gain of said audio signals output by said music jukebox.

47. A music jukebox as recited in claim 1, wherein said data storage memory comprises random address memory.

48. A music jukebox as recited in claim 1, wherein said data storage memory comprises solid state memory.

\* \* \* \* \*

UNITED STATES PATENT AND TRADEMARK OFFICE
CERTIFICATE OF CORRECTION

PATENT NO. : 6,587,403 B1
DATED : July 1, 2003
INVENTOR(S) : Peter J. Keller and Michael J. Kelley It is certified that error appears in the above-identified patent and that said Letters Patent is hereby corrected as shown below:

Column 3,
Line 25, "modem" should be -- modern --

Column 6,
Line 16, "inch;" should be -- inch, --
Line 48, "thereof As" should be -- thereof.  As --

Column 16,
Line 38, "back to 4o" should be -- back to --

Column 20,
Line 58, "a modem-day" should be -- a modern-day --

Column 21,
Line 34, "track selected" should be -- track --
Line 51, "such that the" should be -- such that --

Column 22,
Line 63, "conecting" should be -- connecting --

Column 24,
Line 28, "a phone" should be -- a phono --

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,587,403 B1                                              Page 1 of 1
DATED          : July 1, 2003
INVENTOR(S)    : Peter J. Keller and Michael J. Kelley It is certified that error appears in the above-identified patent and that said Letters Patent is hereby corrected as shown below:

Column 11,
Line 23, "RAM (see FIG. 5)" should read -- RAM (see FIG. 5a) --
Lines 57-58, "compact disc recorder 94" should read -- compact disc recorder 30 --
Line 60, "the compact disc recorder 94" should read -- the compact disc recorder 30 --

Column 12,
Line 65, "analog signals as the two put output lines" should read -- analog signals via the two output lines --

Column 14,
Lines 9-10 and 12, "compact disc recordable drive 56" should read -- compact disc recordable drive 58 --

Column 18,
Line 36, "selection menu 266 indicates" should read -- selection menu 268 indicates --

Signed and Sealed this

Twenty-seventh Day of January, 2004

JON W. DUDAS
*Acting Director of the United States Patent and Trademark Office*